(12) United States Patent
Kim et al.

(10) Patent No.: US 9,789,468 B2
(45) Date of Patent: Oct. 17, 2017

(54) SCR CATALYST CONTAINING CARBON MATERIAL LOADED WITH VANADIUM AND TUNGSTEN AND METHOD OF PREPARING SAME

(71) Applicant: KOREA INSTITUTE OF INDUSTRIAL TECHNOLOGY, Cheonan-si, Chungcheongnam-do (KR)

(72) Inventors: Hong Dae Kim, Cheonan-si (KR); Eok Soo Kim, Ulsan (KR); Ji Yoon Choi, Ulsan (KR)

(73) Assignee: KOREA INSTITUTE OF INDUSTRIAL TECHNOLOGY, Cheonan-si, Chungcheongnam-do (KR)

( * ) Notice: Subject to any disclaimer, the term of this patent is extended or adjusted under 35 U.S.C. 154(b) by 0 days.

(21) Appl. No.: 15/119,388

(22) PCT Filed: Sep. 26, 2014

(86) PCT No.: PCT/KR2014/009064
§ 371 (c)(1),
(2) Date: Aug. 17, 2016

(87) PCT Pub. No.: WO2015/126025
PCT Pub. Date: Aug. 27, 2015

(65) Prior Publication Data
US 2017/0056859 A1    Mar. 2, 2017

(30) Foreign Application Priority Data

Feb. 18, 2014  (KR) ........................ 10-2014-0018646
Feb. 18, 2014  (KR) ........................ 10-2014-0018665

(51) Int. Cl.
*B01J 23/22*    (2006.01)
*B01J 23/30*    (2006.01)
(Continued)

(52) U.S. Cl.
CPC .......... *B01J 23/30* (2013.01); *B01D 53/9418* (2013.01); *B01J 21/063* (2013.01);
(Continued)

(58) Field of Classification Search
CPC ... B01J 23/22; B01J 23/30; B01J 21/18; B01J 23/063; B01J 35/0006; B01J 35/04;
(Continued)

(56) References Cited

U.S. PATENT DOCUMENTS 3,737,492 A * 6/1973 Stander et al. ...... B01J 37/0009
264/0.5
8,658,555 B1 * 2/2014 Bandosz ................ B01D 53/52
423/242.1
(Continued)

FOREIGN PATENT DOCUMENTS

JP    10-323570 A    12/1998
JP    03521933 B2    2/2004
(Continued)

OTHER PUBLICATIONS

International Search Report for PCT/KR2014/009064 dated Jan. 9, 2015 from Korean Intellectual Property Office.

*Primary Examiner* — Patricia L Hailey
(74) *Attorney, Agent, or Firm* — Revolution IP, PLLC

(57) ABSTRACT

Provided is a selective catalytic reduction (SCR) catalyst containing a carbon material loaded with vanadium and tungsten and a method of preparing the same, and relates to a method of loading vanadium and tungsten on a carbon material that exhibits excellent abrasion resistance and excellent strength and can be easily prepared.

8 Claims, 14 Drawing Sheets

(51) Int. Cl.
- *B01J 37/00* (2006.01)
- *B01D 53/94* (2006.01)
- *B01J 21/06* (2006.01)
- *B01J 35/00* (2006.01)
- *B01J 35/04* (2006.01)
- *B01J 37/04* (2006.01)
- *B01J 37/08* (2006.01)
- *B01J 37/34* (2006.01)

(52) U.S. Cl.
CPC ............ *B01J 35/0006* (2013.01); *B01J 35/04* (2013.01); *B01J 37/0009* (2013.01); *B01J 37/04* (2013.01); *B01J 37/08* (2013.01); *B01J 37/343* (2013.01); *B01D 2251/2062* (2013.01); *B01D 2255/20707* (2013.01); *B01D 2255/20723* (2013.01); *B01D 2255/20776* (2013.01); *B01D 2255/702* (2013.01)

(58) Field of Classification Search
CPC ........ B01J 37/0009; B01J 37/04; B01J 37/08; B01J 37/343; B01D 53/9418; B01D 2251/2062; B01D 2255/20707; B01D 2255/20723; B01D 2255/20776; B01D 2255/702; C01B 31/043
USPC ..... 502/5, 309, 312, 350; 264/464, 628, 634, 264/638, 642
See application file for complete search history.

(56) References Cited

U.S. PATENT DOCUMENTS

| | | | |
|---|---|---|---|
| 2001/0025009 A1* | 9/2001 | Fischer | B01D 53/9418 502/242 |
| 2014/0072490 A1* | 3/2014 | Dotzel | B01J 23/30 423/212 |
| 2015/0298976 A1* | 10/2015 | Lee | B82Y 40/00 428/702 |

FOREIGN PATENT DOCUMENTS

| | | |
|---|---|---|
| JP | 2006-175341 A | 7/2006 |
| KR | 10-1997-7003191 A | 7/1997 |
| KR | 10-1998-0024328 A | 7/1998 |

* cited by examiner (a)        (b)        (c)

SCR CATALYST

SCR CATALYST CONTAINING CARBON MATERIAL LOADED WITH VANADIUM AND TUNGSTEN AND METHOD OF PREPARING SAME

CROSS REFERENCE TO PRIOR APPLICATIONS

This application is a National Stage Application of PCT International Patent Application No. PCT/KR2014/009064 filed on Sep. 26, 2014, under 35 U.S.C. §371, which claims priority to Korean Patent Application No. 10-2014-0018646 filed on Feb. 18, 2014 and Korean Patent Application No. 10-2014-0018665 filed on Feb. 18, 2014, which are all hereby incorporated by reference in their entirety.

TECHNICAL FIELD

The present invention relates to a method of loading vanadium and tungsten on a carbon material, and particularly to a method of preparing a selective catalytic reduction (SCR) catalyst by loading vanadium and tungsten on a carbon material by an evaporation method, an impregnation method, and an impregnation method that uses a dispersant.

BACKGROUND ART

As the standard of living improves and the demand for a more comfortable life spreads with time, the awareness of environmental issues is increasing each day. Especially, artificially emitted sources currently represent an important proportion of air pollutants due to industrialization and the advancement of industries in contrast to the past when naturally emitted sources accounted for most of the air pollutants, and the generation of nitrogen oxides (NOx) during combustion is inevitable at sites using fossil fuels, such as chemical plants or power plants, and the amount of NOx emission from mobile pollution sources, such as automobiles and vessels, accounts for the highest percentage of air pollutants. NOx exists mostly in the form of NO, but in air, NO not only induces the greenhouse effect by oxidizing easily into NOx, which is harmful to humans, but also acts as a causative element of photochemical smog that is 310 times more effective than $CO_2$ by combining with oxygen in the presence of ultraviolet rays. In addition, since NOx is a cause of acid rain besides sulfur oxides, causes harm such as a chronic respiratory disease by inducing toxicity in the respiratory tract when inhaled into the body of animals including humans, it should be removed before being released into the air.

In the case of thermoelectric power plants in South Korea, coal, petroleum, and LNG account for about 60% of the energy sources required for the generation of electricity, indicating that those thermoelectric power plants are highly dependent on fossil fuels, and such a proportion is still on the rise. Such thermoelectric power plants currently release NOx at a level of 100 to 1,300 ppm, and, due to the reinforcement of environmental laws, the emitted sources are regulated to be in the range of 70 to 200 ppm. In addition, with the regulation of NOx emission in accordance with the International Maritime Organization (IMO) and the effectuation of Euro VI, environmental laws are currently being applied to mobile pollution sources such as automobiles and vessels.

Such methods of reducing NOx emissions include pretreatment techniques that suppress the generation of NOx by modifying combustion conditions and post-processing techniques that handle NOx that has been generated. The post-processing techniques may be classified into wet processes and dry processes, depending on the use of an aqueous solution. However, there is a limit to the pretreatment techniques that improve combustion conditions, and the pretreatment techniques are far less effective for reducing NOx emissions compared to the post-processing techniques.

Among the above, the selective catalytic reduction (SCR) process, which is a dry process that is excellent in terms of removal efficiency and economic feasibility, is being commercially widely used.

The SCR process utilizes a reducing agent such as $NH_3$, urea, and a hydrocarbon for NOx removal, and such reducing agents are used with a catalyst phase to reduce NOx into a gas such as $N_2$ or $H_2O$, which is not harmful to the human body. When ammonia is used as the reducing agent, an offensive odor and toxicity result. Also, ammonium sulfate produced as $SO_3$, which is obtained through the oxidation of $SO_2$ among the components in the exhaust, reacts with unreacted ammonia in the exhaust is a main cause of the corrosion of equipment, thus reducing the service life of the equipment. Therefore, in preparing a catalyst, the SOx conversion ratio should be taken into account.

Catalysts based on $V_2O_5$—$WO_3$—$TiO_2$, which were recently commercialized and are being most widely used, exhibit high catalytic activity and strong adaptability to the environment, and thus are the catalysts most widely used for handling the NOx present in exhausts from power plants and incinerators. Among the components, the use of $V_2O_5$, which is a catalytically active component, is generally limited to an amount of about 0.3 to 1.5 wt % vanadium (V), because, although $V_2O_5$ functions to increase catalyst activity by catalyzing the conversion of NOx into $N_2$ through a redox cycle, the addition of an excessive amount of $V_2O_5$ results in the oxidation of $NH_3$ into $N_2O$ within the high-temperature region.

In addition, higher vanadium contents lead to higher values of the SOx conversion ratio, and, when released into the environment as a heavy metal, vanadium gives a significant impact on human health or on the environment. Also, it has been reported that the price of vanadium in 2015 is expected to reach 75 dollars per kilogram due to the recent consistent increase in demand and price. Therefore, reducing vanadium consumption is required.

DISCLOSURE

Technical Problem

Hence, the present invention is devised to solve the aforementioned problems. The present invention is directed to providing a selective catalytic reduction (SCR) catalyst containing a carbon material loaded with vanadium and tungsten, the SCR catalyst being capable of reducing vanadium consumption by loading vanadium and tungsten on a carbon material such as graphene; and a method of preparing the same.

Technical Solution

To reduce the vanadium consumption, graphene was used as a matrix to be loaded with a catalyst in the present invention. Graphene, whose name is the word made by combining "graphite" with "-ene", which is a suffix having the meaning of a molecule with a carbon-carbon double bond, is a material in which carbon atoms are connected to one another in the form of hexagons to form a honeycomb-like, two-dimensional planar structure. By having a high specific surface area and a high strength, graphene can make an excellent support. Graphene is a material with a very high strength that is as large as about 200 times the strength of steel, a breaking strength of 42 N/m and a Young's modulus that is as large as 1 TPa. In addition, graphene is semi-metallic and is a very thin material, judging from the fact that a single layer of graphene has a thickness of 3 Å. The large specific surface area, high thermal conductivity that is as large as 10 times the thermal conductivity of copper, excellent inherent charge mobility, 97.7% optical transmittance, and superior electrical conductivity that graphene exhibits demonstrate the extensive application potential of graphene.

Hence, to reduce the amount of vanadium used in an SCR catalyst, the denitrification performance and properties of the SCR catalyst when the SCR catalyst contains graphene loaded with a small amount of vanadium distributed thereon were measured in the present invention. As the graphene, a graphene oxide (GO) and a reduced graphene oxide (RGO) were used, and, to comparatively analyze the loading of vanadium, vanadium was loaded by an evaporation method, an impregnation method, and an impregnation method that uses a dispersant. In addition, ammonium meta vanadate (AMV), which is a starting material, was distributed and loaded in a ratio of 0.25 wt % and 0.05 wt % on a graphene-oxide (GO/RGO) basal matrix, and also a standard SCR catalyst having a composition similar to that of a commercial SCR catalyst containing vanadium at 0.5 wt % and free of an added graphene (GO/RGO) was prepared and evaluated for a comparative analysis of denitrification and properties.

Although graphene was particularly used in the present invention, any carbon material having properties similar to those of graphene may also be possibly used.

The method of preparing an SCR catalyst according to the technical concept of the present invention to accomplish the aforementioned objects includes: a first process of mixing a vanadium ($V_2O_5$) and tungsten oxide ($WO_3$)-supported catalyst with titanium dioxide ($TiO_2$); a second process of extruding the mixture into a desired shape using a vacuum extruder; and a third process of drying the extruded object and then sintering the same.

According to an exemplary embodiment of the present invention, the vanadium ($V_2O_5$) and tungsten oxide ($WO_3$)-supported catalyst is prepared through processes including a process of dispersing GO or RGO in deionized water; a process of dispersing AMV, which is a precursor of vanadium, and ammonium meta tungstate (AMT), which is a precursor of tungsten, in deionized water; and a process of mixing, by stirring, the resulting substances, evaporating the same, drying the same, and heat-treating the same.

According to another exemplary embodiment of the present invention, the vanadium and tungsten-supported catalyst is prepared through processes including a process of dispersing GO or RGO in deionized water; a process of dispersing AMV, which is a precursor of vanadium, and AMT, which is a precursor of tungsten, in deionized water; a process of mixing, by stirring, the resulting substances; and a process of collecting the supported catalyst through filtration by feeding the stirred substances into a vacuum filtration device, drying the supported catalyst, and heat-treating the same.

According to a still another exemplary embodiment of the present invention, the vanadium and tungsten-supported catalyst is prepared through processes including a process of dispersing GO or RGO in deionized water by utilizing a dispersant; a process of dispersing AMV, which is a precursor of vanadium, and AMT, which is a precursor of tungsten, in deionized water; a process of mixing, by stirring, the resulting substances; and a process of collecting the supported catalyst through filtration by feeding the stirred substances into a vacuum filtration device, drying the supported catalyst, and heat-treating the same.

Advantageous Effects

A method of loading vanadium on a carbon material according to the present invention has the following effects:

1. When vanadium was loaded on graphene (GO or RGO) by an evaporation method, a grain growth in the form of vanadium whiskers due to the heat applied for evaporation was observed.

2. When vanadium was loaded by an impregnation method, the vanadium particles were loaded in an agglomerated manner on GO, and in the case of RGO, vanadium was loaded on some parts of the RGO without the agglomeration of vanadium particles.

3. When loaded by an impregnation method that uses a dispersant, vanadium and tungsten were observed to have been loaded on the overall surface of RGO without the agglomeration of vanadium.

4. According to the result of denitrification performance assessment, the highest low-temperature (250° C.) efficiency of 82.5% was observed with the standard (0.5 wt % V) catalyst, but as the temperature increased, a higher denitrification efficiency of 86.4% was observed with the catalyst containing RGO loaded with 0.25 wt % V, rather than with the standard catalyst.

5. When subjected to a strength test, the catalysts containing RGO loaded with 0.25 wt % V and 0.05 wt % V were found to have strengths measured at 1230.7 kgf/cm$^2$ and 1038.5 kgf/cm$^2$ respectively, which were greater compared to the strength of 1082.3 kgf/cm$^2$ of the standard catalyst. Also, when the strength was tested by applying a different amount (the amount is doubled or halved based on the RGO content in the above catalyst with 0.05 wt % V) of RGO, it was found that the strength was greater with a higher RGO content.

6. According to the result of an abrasion test, the standard catalyst exhibited an erosion rate of about 8% and the catalyst prepared by loading vanadium on RGO in a ratio of 0.25 wt % or 0.05 wt % exhibited an erosion rate of about 10%, indicating that the standard catalyst has the highest abrasion resistance.

7. According to the result of measuring the ratio of SOx conversion, which is a side reaction of an SCR process, in the catalyst containing RGO loaded with 0.25 wt % V, the SOx conversion ratio of about 0.9%, which is lower compared to the standard catalyst's SOx conversion ratio of about 1%, was observed with the catalyst containing RGO loaded with 0.05 wt % V. However, the difference is less than about 0.1%, indicating that graphene has an insignificant effect on the SOx conversion ratio of the SCR catalyst.

8. The vanadium content of each catalyst was determined based on a $TiO_2$ peak, a $WO_3$ peak and a $V_2O_5$ peak from XRD and through XRF analysis, and it was found that the contents of $TiO_2$ and $WO_3$ were about 78% and 7.3%, respectively, wherein $TiO_2$ is a main component of the SCR catalyst. In addition, the crystalline phase of $TiO_2$ of the SCR catalyst according to the sintering temperature was an anatase phase, and transition thereof into a rutile phase was not observed.

9. The surface of the standard catalyst and the catalysts with one of 0.25 wt % V and 0.05 wt % V, which were sintered at one of 300° C., 400° C., and 500° C., were examined through the SEM analysis, and it was found that the particle size increased with an increasing sintering temperature.

MODES OF THE INVENTION

Figure 1:
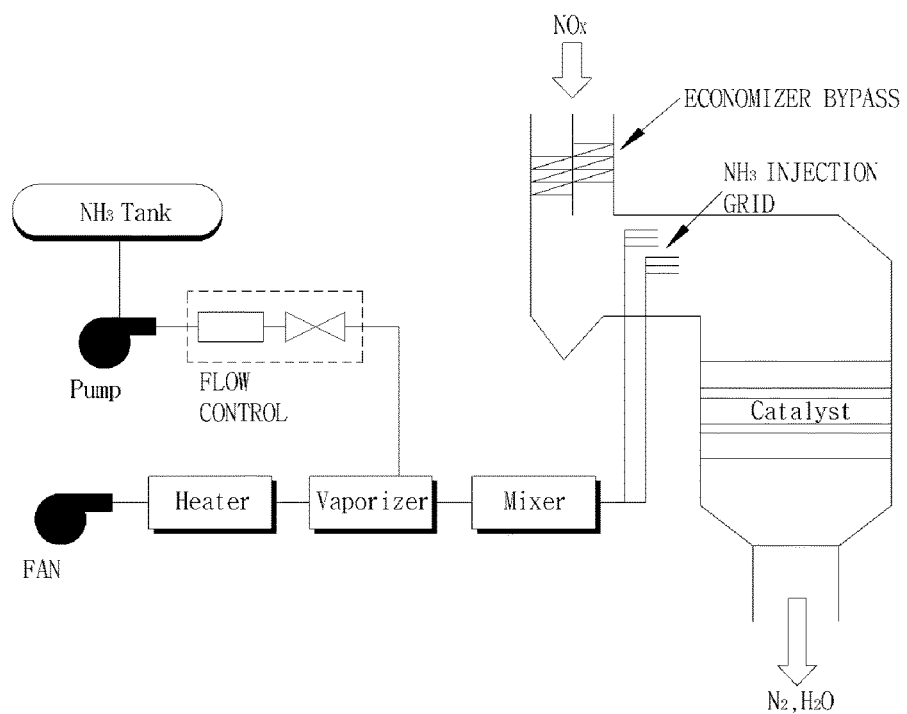
FIG. 1 is a block diagram for illustrating a general configuration of a selective catalytic reduction (SCR) process used in the present invention.

The method of loading vanadium and tungsten on a carbon material according to exemplary embodiments of the present invention will be described in detail with reference to accompanying drawings. While the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. In describing the drawings, like reference numerals are used to refer to like elements. In the accompanying drawings, the dimensions of structures are illustrated as enlarged for the clarity of the present invention or reduced to aid the understanding of schematic configurations.

Terms such as "a/the first" and "a/the second" may be used to describe various elements of the present invention, but the elements should not be limited to the terms. Such terms are used to merely distinguish one element from the other(s). For example, "the first element" may also be named "the second element," and similarly, "the second element" may also be named "the first element," without departing from the scope of the present invention. Meanwhile, unless defined otherwise, all terms, including technical or scientific terms, used herein have the same meaning as commonly understood by a person of ordinary skill in the technical field to which the present invention belongs. Generally used terms such as those defined in a dictionary shall be construed as having the same meaning in the context of the relevant art and, unless explicitly defined otherwise, do not have an idealistic or excessively formalistic meaning.

Hereinafter, the configuration of the present invention will be described in detail through examples.

First, the selective catalytic reduction (SCR) process used throughout the present invention will be briefly examined.

Figure 2:
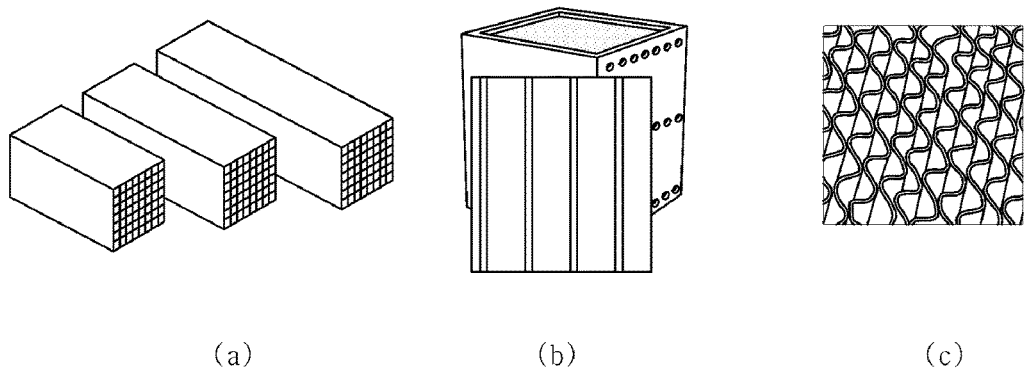
FIG. 2 is a set of actual images of SCR catalysts, each having a shape or pattern of (a) a honeycomb, (b) a plate, and (c) waves.

FIG. 1 is a block diagram for illustrating a general configuration of a selective catalytic reduction (SCR) process used in the present invention, and FIG. 2 is a set of actual images of SCR catalysts, each having a shape or pattern of (a) a honeycomb, (b) a plate, and (c) waves.

Among the current techniques of removing NOx that is contained in exhausts generated from stationary pollution sources such as power plants and incinerators, the SCR technique using a catalyst is known to be most desirable in technical and economic aspects. The SCR technique is a technique of selectively reducing NOx into nitrogen ($N_2$) and water vapor ($H_2O$) by mixing a combustion gas containing NOx with a reducing agent and then passing the mixture through a catalyst layer. The reducing agent used in the SCR technique may be an ammonia-based compound containing ammonia ($NH_3$) and urea (($NH_2$)2CO) or a non-ammonia-based compound such as a hydrocarbon. The reducing agent is mixed by a transporting gas and then is sprayed into the exhaust through an injection grid in front of an SCR catalyst. Since the first SCR of NO by utilizing $NH_3$ as performed by Cohn et al. (1961), many tests regarding the NOx removal from exhausts have been conducted, and, since the world's first application of the SCR technique to power plants and industrial furnaces in Japan in the late 1970s, the commercial operation of the SCR technique in Europe has been expanded since 1985, and the SCR technique is a technique that has already been sufficiently demonstrated.

The SCR equipment is roughly classified into an SCR reactor, a system for loading and storing a reducing agent, and a system for injecting the reducing agent. The SCR reaction stage is a part in which the actual SCR reaction is carried out by being supplied with the reducing agent, evenly spraying the reducing agent to the front of a catalyst stage, allowing the reducing agent to be homogeneously mixed with an exhaust, and then allowing the mixture to pass through a catalyst layer. In the SCR reaction stage, an SCR reactor, a grid for injecting a reducing agent, instrumentation and control equipment, and the like are installed. The system for injecting a reducing agent is the part that begins with a connection flange of an exhaust pipe of a reducing agent storage tank and ends with a connection flange in front of the grid for injecting a reducing agent. Ammonia is vaporized into a gas using secondary steam or an electric heater and is subsequently diluted with air into the explosion range, and a suitable amount thereof is supplied to a catalyst reactor.

Here, the system for injecting a reducing agent is configured of a vaporizer, a ventilator for supplying the reducing agent, a mixer, a dilution ventilator, and the like.

Various SCR catalysts ranging from metal oxide catalysts to zeolite catalysts have been proposed, and intensive research for examining the impact of reaction conditions on each catalyst is underway. Metal-oxide based catalysts are catalysts composed of a highly reactive metal or a mixture of oxides of such metals, and representative metal-oxide based catalysts include Pt, $V_2O_5$—$Al_2O_3$, $V_2O_5$—$TiO_2$, $V_2O_5$—$SiO_2$—$TiO_2$, $WO_3$—$TiO_2$, $Fe_2O_3$—$TiO_2$, CuO—$TiO_2$, CuO—$Al_2O_3$, and the like. Representative zeolite-based catalysts include Y-Zeolite, mordenite, ZSM-5, and the like. The properties expected of the catalyst used in an SCR reaction include high catalyst activity, high selectivity towards $N_2$, and excellent durability against SOx, and, in the aspects of the activity and the resistance to SOx, most of currently commercially operated SCR processes utilize a $V_2O_5$—$TiO_2$ catalyst by default.

In the case of mobile pollution sources such as automobiles and vessels, precious-metal based catalysts and zeolite-based catalysts are frequently used, and, in the case of stationary pollution sources such as power plants, sintering plants, and industrial furnaces, metal-oxide based catalysts are frequently used. Such catalysts have the shape of pellets, a honeycomb, waves, a plate, or the like. Among the SCR catalysts, honeycomb-type, $V_2O_5/TiO_2$ based catalysts have excellent resistance to $SO_2$ and are most widely used due to the high commercial stability thereof. However, by having a limited surface area and a limited pore structure, such honeycomb-type, $V_2O_5/TiO_2$ based catalysts are inadequate to be classified as catalysts capable of exhibiting more improved reactivity and durability. It has been known that the durability of an SCR catalyst towards catalyst poisoning can be controlled by structural variables of the material used as the catalyst support. Beeckman et al. reports that the acquisition of reactivity and the alleviation of reduced activity caused by catalyst poisoning in an SCR reaction can be achieved by optimizing the pore structure of the catalyst. In particular, when both micropores and macropores exist, the macropores act as a filter that filters out catalyst poisons, which are influenced relatively more by diffusion resistance, and thereby alleviate reduced catalyst activity.

Despite the efficiency of 90% or more upon the initial installation of the catalyst, the denitrification performance of the catalyst sharply decreases when poisoning and catalyst activity reduction are caused by sulfur oxides and particulate substances. Therefore, as a preventive measure, the catalyst is usually installed into a device in the immediate front of a chimney. However, in this case, much expense is required for a reheating process that aims to raise the temperature of the exhaust, which was cooled during the previous process, up to a temperature suitable for a catalytic reaction. For this reason, recently, the development of a low-temperature catalyst exhibiting high activity even at a low temperature (200° C. or less) is actively ongoing.

In the SCR reactor, the amount of NOx is reduced according to the reactions represented by the following Chemical Reaction 1.

$$4NO+4NH_3+O_2 \rightarrow 4N_2+6H_2O$$

$$2NO_2+4NH_3+O_2 \rightarrow 3N_2+6H_2O$$

$$6NO+4NH_3 \rightarrow 5N_2+6H_2O$$

$$NO+NO_2+2NH_3 \rightarrow 2N_2+3H_2O$$

$$6NO+8NH_3 \rightarrow 7N_2+12H_2O \qquad \text{[Chemical Reaction 1]}$$

All of the above reactions reduce the amount of NOx, and the first reaction among the above reactions corresponds to the dominant reaction of the overall SCR reaction. Meanwhile, undesirable reactions that take place in the SCR system include a competitive reaction with oxygen and a nonselective reaction, both of which are frequently found in the system. Such reactions either produce a secondary pollutant(s) or consume ammonia in an unproductive way. Ammonia can produce $N_2$, NO, $NO_2$, $N_2$, $N_2O$, and the like by reacting with oxygen, and, in most SCR catalyst phases, the $NH_3$ oxidation reaction becomes more active as the reaction temperature increases up to the point at which it competes with an NOx reduction reaction, which is the main reaction, which leads to a phenomenon in which the NOx conversion ratio as a function of temperature reaches the highest point at a certain temperature.

Since NOx is generated by the reactions represented by the following Chemical Reaction 2, such reactions should be inhibited. The rate of the reactions increases with an increasing reaction temperature. However, as the term "selective" suggests, the dominant reaction provided at the top of the list, rather than the direct oxidation of ammonia, occurs much more easily as the main reaction.

$$4NH_3+3O_2 \rightarrow 2N_2+6H_2O$$

$$4NH_3+5O_2 \rightarrow 4NO+6H_2O$$

$$4NH_3+7O_2 \rightarrow 4NO_2+6H_2O$$

$$2SO_2+O_2 \rightarrow 2SO_3$$

$$2NH_3+H_2O+2NO_2 \rightarrow NH_4NO_3+NH_4NO_2 \qquad \text{[Chemical Reaction 2]}$$

At low temperatures within the range of about 100 to 200° C., ammonia produces explosive ammonium nitrate ($NH_4NO_3$) by reacting with $NO_2$. Such a reaction may be avoided by controlling the temperature in such a way that it does not fall to 200° C. or less, and the reaction may be minimized by spraying an exact amount of $NH_3$, in which case, the amount of $NH_3$ is equal to or less than the amount required for a complete reaction with NOx. Spraying an insufficient amount of $NH_3$ results in a low NOx conversion ratio, and spraying an excessive amount of $NH_3$ leads to the release of ammonia into the air. The above phenomenon in which ammonia is not completely consumed in a catalytic reaction in the SCR system but is released into the air is referred to as ammonia slip. Ammonia slip increases more when the $NH_3/NOx$ ratio is higher. According to the dominant reaction (leading reaction) in SCR, it can be seen that the stoichiometric coefficient of $NH_3/NOx$ is 1 in the SCR system. When the $NH_3/NOx$ ratio is greater than 1, the phenomenon of ammonia slip increases significantly. For an actual use, the $NH_3/NOx$ ratio of 0.9 to 1, which can minimize ammonia slip while maintaining the NOx conversion efficiency at a satisfactory level, is selected. The reactions of the Chemical Reaction 2 additionally produce a salt(s). In an actual exhaust, the NOx to be removed and $SO_2$ participate in a reaction to produce a sulfate(s), or NO, which is a reactant, reacts with $NH_3$ to produce a nitrate.

Since the aforementioned salts not only reduce catalytic activity but also hinder the operation of the reactor by blocking the pipe through which a reaction gas flows, the formation of such salts should be inhibited. The formation of the salts in a system may be inhibited by maintaining the temperature of the entire system at about 150° C.

Next, brief descriptions of graphene used in the present invention will be provided.

Graphene, whose name is the word made by combining "graphite" with "-ene", which is a suffix having the meaning of a molecule with a carbon-carbon double bond, is a material in which carbon atoms are connected to one another in the form of hexagons to form a honeycomb-like, two-dimensional planar structure.

Graphene in a structural sense is a basic structure of carbon nanostructures that have attracted much attention for the last 20 years or so. Graphene forms three-dimensional graphite when stacked layers upon layers, forms a one-dimensional carbon nanotube when rolled into the shape of a cylinder, and forms fullerene when wrapped up into the shape of a soccer ball. The existence of graphene has been known for a long time, and the separation of a thin-film carbon layer through the heat treatment and chemical reduction of graphite oxide in 1962 is considered as the beginning of the awareness of graphene. Although graphene had been recognized to be thermodynamically unstable in the air, graphene has been actively researched since the British research team of Geim and Navoselov introduced a technique of exfoliating graphene from graphite using an adhesive tape in 2004 and introduced the unique characteristics, excellent electrical properties, and excellent physical properties of graphene.

Graphene is sufficiently thin and transparent so as to be invisible to the naked eye, and, by being configured of chemically highly stable carbon, graphene exhibits excellent electrical conductivity. By being capable of elongation or bending due to excellent elasticity, having high charge mobility that is as high as 100 times the charge mobility of monocrystalline silicon and current density that is as large as 100 times the current density of copper when ideally structured, exhibiting superior thermal conductivity and superior chemical resistance, and being capable of various chemical functionalization besides exhibiting sufficiently high stretch ability to be capable of stretching by 20% of the inherent area and having a large strength that is as large as 200 times or more of the strength of steel, graphene is drawing attention as a novel material for reinforcing a body of an aircraft and the like. By having the aforementioned, superior mechanical and electrical characteristics and excellent thermal characteristics, graphene is being applied in various fields such as in those of semiconductors, secondary batteries, transparent electrodes, and catalysts.

The molecular structure of graphene is made of carbon atoms that constitute a plane of hexagons in a similar manner to the structure of a honeycomb, and serves as a basic building block of graphite, carbon nanotubes, or a bucky-ball.

The carbon nanotube or the bucky-ball has a structure in which graphene is rolled into the shape of a cylinder or wrapped up into the shape of a ball, and graphite has a structure formed by the graphene sheets stacked layer upon layer into a three-dimensional structure. The bond found in the plane of graphene is a σ bond, which forms an $sp^2$ hybrid orbital and is one of the strongest bonds. In contrast, the bond between graphene layers is a π bond, which contributes to the electronic conduction of graphene by forming a non-ubiquitous electronic network. In addition, the π bond creates a weak binding strength between graphene layers and between graphene and a substrate through the van der Waals force. The measured thickness of a graphene film slightly varies for each research group, and is in the range of 0.35 nm to about 1.00 nm.

Graphene is a material with a very high strength, which measures as large as about 200 times the strength of steel and is greater than about twice the strength of nanotubes, which are known to be the strongest so far. Among materials known to the world so far, a pure, single-layered graphene membrane has recorded the largest strength, having a breaking strength of 42 N/m and Young's modulus of 1.0 TPa.

Due to the aforementioned properties, graphene has unlimited applications including tennis rackets, automobiles, and aircraft exterior. Besides, graphene has the visible-light absorption of about 2.3% for each layer, and single-layered graphene is a highly transparent material by having a transmittance of about 97.7%. Also, a graphene sheet having a high specific surface area of 2630 $m^2$/g may easily form an irreversible agglomeration, but such an agglomeration may be reduced by adhering small molecules or polymers to the graphene sheet, and, when the graphene sheet contains hydrophilic or hydrophobic groups, agglomerations do not occur due to strong polar-polar interactions. When functional groups are attached to graphene, the graphene may be able to easily disperse in a hydrophilic medium or a hydrophobic medium, and easily disperses even in a polymer.

Graphene does not lose electrical conductivity even when the area thereof is stretched by 10% or more or is folded, and due to such flexibility, graphene may be bent to form a ball-shaped material, carbon nanotubes, or the like and be used as a transparent electrode in a flexible display.

The room-temperature thermal conductivity of graphene is in the range of $4.84 \times 10^3$ to $5.30 \times 10^3$ W/mK for the single-layered graphene, which is a level higher than the room-temperature thermal conductivity of carbon nanotubes or diamond by 50% and is about 10 times greater than that of metals such as copper or aluminum. Based on the results, it can be seen that graphene has very high thermal conductivity.

Many of the properties, such as the crystalline structure, of carbon allotropes that are normally made through covalent bonds are determined according to the manner in which the wave functions of the four outermost electrons linearly combine. In most solids having covalent bonds, the probability distribution of finding an electron reaches a maximum between atoms. However, in graphene, only the linear combination of three outermost electrons (σ-orbital) participates in a strong covalent bond between carbon atoms to form a plane having a shape of a hexagonal grid, and the wave function of the other outermost electron exists in a manner perpendicular to the plane, which makes the reaction with the π electron of graphene and the outermost molecular orbital(s) of an organic molecule easy. That is, in the case of graphene, an electrophilic substitution reaction occurs more easily than a nucleophilic substitution reaction. In addition, graphene undergoes a cycloaddition reaction, a click reaction, and a carbene insertion reaction. Reactions on a surface of graphene disturb the surface structure, result in defects due to the destruction of the $sp^2$ structure, and cause a loss of electrical conductivity. In the lattice of graphene, the area being more stressed in a topological sense exhibits higher chemical reactivity compared to other areas. Also in the case of terminal areas of graphene, the thermodynamically unstable, zigzag-shaped terminal areas exhibit higher reactivity. The electrons perpendicular to the plane (π-orbital) are main factors determining the physical properties of graphene.

Among properties of graphene, the most unique of all is that the charges behave like massless relativistic particles or Dirac fermions. Graphene is a semiconductor with a band gap of 0 and, depending on whether it is doped or not, graphene exhibits ambipolar conduction capable of easily changing the type of the charge carrier. In particular, the electronic structure of graphene exhibits linear energy-momentum dispersion in which a conduction band and a valence band meet at each point of the Brillouin zone, having a dispersion relation (E∝k) in which the electronic momentum and energy are proportional to each other near the Fermi energy, and such characteristics are important factors determining the exceptional electrical and optical properties of graphene. At room temperature, graphene has an electrical conductivity of 7200 $Scm^{-1}$ and a mobility of up to 200,000 $cm^2V^{-1}s^{-1}$.

Since effective mass valued zero is required to have the linear energy-momentum dispersion relation near a Dirac point, electrons of graphene are defined as massless Dirac fermions, which accounts for the high electron mobility in graphene. In particular, the electrons can migrate several micrometers nearly without being scattered even under atmospheric conditions.

The possibility of obtaining graphene in an easy and convenient way, as well as the excellent properties of graphene, was the reason that graphene could be appealing in industry. Since being obtained through mechanical exfoliation (so-called the "Scotch tape method"), which was presented to researchers for the first time in 2004, graphene has given the industry a difficult task of growing high-quality graphene in a large scale. As a result, graphene is being researched on the basis of chemical synthesis methods, CVD growth methods, and an epitaxial synthesis method as well as the Scotch tape method, and excellent results thereof are consistently reported.

The technique of preparing a graphite oxide by oxidizing graphite and inserting an ionic material between layers to increase the interlayer distance has already attracted attention since 1974, and research thereof has been carried out usually for electrode active materials in a secondary batteries or in a supercapacitor. Since the Ruoff group suggested the possibility of mass-producing graphene using a graphite oxide as a base material in 2006, a tremendous amount of research has been conducted, and, as excellent properties of graphene were revealed through experiments, a single layer of a graphene oxide separated from a graphite oxide has been at the center of much attention in recent years.

The Scotch tape method, which initiated research on graphene, places a graphite flake on a piece of Scotch tape and then repeatedly folds and unfolds the tape several times. After the process is complete, the tape is placed on a $SiO_2$ wafer, the part of the tape with a remaining trace of the flake is rubbed, and then the tape is removed. In this way, graphene ranging from a single layer to multilayers can be observed with an optical microscope. Such a method is possible because three carbon atoms on a two-dimensional plane of graphene are connected through the relatively weak van der Waals force, leading to a very low interlayer friction coefficient and thus causing graphene to be separable even with the weak adhesive strength provided by the Scotch tape. However, since the size and shape of the graphene prepared as thus cannot be controlled, such graphene is difficult to be used as an element.

The method at the closest proximity to the two objects of the large-area growth and mass production of graphene is a chemical synthesis method through the oxidation-reduction of graphite. Methods of oxidizing graphite, began by Brodie and Schfhaeutl in the 19th century, have been widely researched by Staudenmaier, Hummers, Offeman, and the like. Among the methods, the method proposed by Hummers is being most widely used by researchers. Since the graphite oxide prepared through oxidation caused by a strong acid and an oxidizing agent is strongly hydrophilic, the insertion of water molecules between planes is easy, causing the interplanar distance to increase to the range of 6 to 12 Å and reducing interlayer π-π interactions and van der Waals forces, and thereby enabling easy exfoliation through long-term stirring or the use of an ultrasonicator. Since the graphene oxide sheet obtained as thus contains a hydroxyl group and an epoxy group on the surface and a carboxyl group bonded to the edge thereof, the graphene oxide sheet loses most of the inherent characteristics of graphene. However, when the functional groups are removed by again reducing the graphene oxide, characteristics similar to those of graphene are attained once again. Research on the complete removal of functional groups through reduction reactions is actively ongoing.

Despite the disadvantages of inferior graphene properties compared to other methods, the chemical synthesis of graphene has huge advantages such as the ease of functionalization, feasibility of mass production and scaling-up, and near-independence of substrate type or structure, and thus research that aims to take advantage of those benefits is being actively carried out.

Since the scaling up of graphene growth using the CVD growth method was accomplished in 2009, the use of graphene for making an element is actively researched, and researchers from various fields have begun to actively participate in the research.

Figure 3:
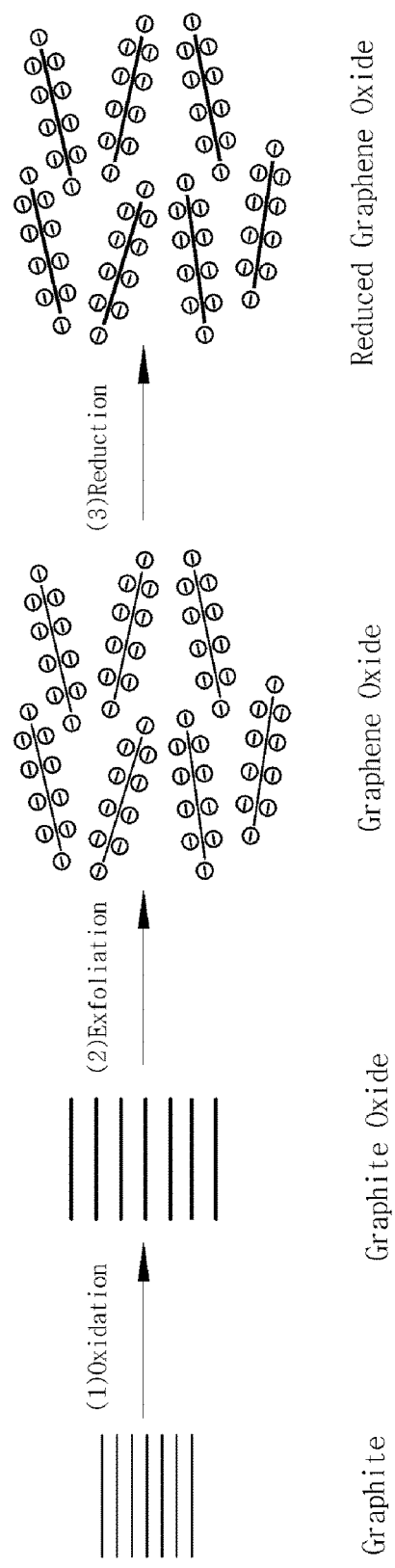
FIG. 3 is a schematic diagram for illustrating the growth of graphene through the CVD growth method used in the present invention and the transferring of graphene onto various substrates.

FIG. 3 is a schematic diagram for illustrating the growth of graphene through the CVD growth method used in the present invention and the transferring of graphene onto various substrates. First, a transition metal such as Ni, Cu, Pt, or the like that effectively adsorbs carbon is prepared as a catalyst layer, and a moderate amount of a mixed gas composed of $CH_4$, $H_2$, and Ar is injected, at a high temperature of 1,000° C. or more, into the transition metal. When carbon in the mixed gas injected at a high temperature rapidly cools after reacting with the catalyst layer, graphene grows on the surface as the carbon is separated from the catalyst. Later, by removing the catalyst layer or a supporting layer using an etching solution, the graphene can be separated and transferred onto a desired substrate. Recently, research based on the study of various CVD growth methods such as PE-CVD and LP-CVD is being carried out to induce the low-temperature growth of high-quality graphene over a large area. Although the graphene prepared through the CVD method has higher purity compared to other graphene and particularly can be made into a desired size, the seriously low production of such graphene has been pointed out as a problem.

According to the epitaxial synthesis method, a material such as silicon carbide (SiC) with a carbon atom either adsorbed to or contained in the crystals is heat-treated under a high-temperature atmosphere of about 1,500° C. so that the carbon can grow along the grain on the surface, thus forming a graphene layer. Although the epitaxial growth method has an advantage of growing graphene directly on an insulated substrate, the method also has disadvantages in that the graphene grown as thus does not have superior properties compared to the graphene grown through the Scotch tape method or the CVD growth method and that the materials are expensive and production is challenging, and thus research for overcoming such challenges is underway.

The chemical exfoliation method representatively prepares a dispersed GO solution by oxidizing graphite crystals and pulverizing the graphite crystals through sonication, and prepares RGO through the process of reducing the GO into graphene using a reducing agent such as hydrazine. Particularly, the GO obtained during the process is a complete insulator, and the chemical structure of graphene is destroyed such that the excellent mechanical properties of graphene are completely lost. However, compared to pure graphene, GO has advantages such as the feasibility of mass production at low cost and ease of processing, and is the first starting point of functionalization for producing chemically modified graphene (CMG).

Since graphene was first separated by the mechanical exfoliation method, various preparation methods of graphene have been developed. The graphene prepared by a chemical method among those mentioned above is referred to as chemically modified graphene. Since graphene is originally a hydrophobic material, to enhance the water solubility, the surface of graphene is oxidized into GO that is composed of a carboxyl group, an epoxy group, and a hydroxyl group. In order to obtain GO, first, graphite is reacted with a strong acid and an oxidizing agent to synthesize the GO. Graphite has a layered structure in which graphene layers are stacked in the sequence of AB, and GO also has a layered structure. However, the $sp^2$ network becomes partly disconnected during the strong oxidation reaction, and various functional groups containing oxygen are linked to the basal plane and the edge portion through covalent bonds. It is generally known that a hydroxyl group and an epoxy group are present on the basal plane and a carboxyl group and a ketone group are present at the edge portion. It has been known that a relatively much larger amount of the hydroxyl group and the epoxy group is present on the basal plane and a small amount of the carboxyl group and the ketone group is present at the edge portion.

Due to the high affinity toward water molecules that results from the aforementioned functional groups, GO exhibits hydrophilicity, become well dispersed in water, and is water-soluble. The oxidized lattice that GO has not only provides the GO with excellent water-solubility and enables stability in water but also enables noncovalent bonding with diols, amines, and phenyls present in biomolecules through π-π stacking and electrostatic coupling.

The first report of GO was by Brodie about 150 years ago, and currently, GO is usually prepared by three different methods, such as the Brodie method (uses $KClO_3$ and $HNO_3$), the Staudenmaier method (uses an excessive amount of $KClO_3$ and a mixture of $HNO_3/H_2SO_4$), and the Hummers method (uses $KMnO_4$ and $H_2SO_4$).

It has been known that the reaction conditions, the oxidation degree of GO, the chemical structure of GO, and the like vary by method. Due to much interest in GO recently, the chemical structure of GO is being frequently researched. A chemical method performed in solution is always required to mass-produce graphene at an economical cost. Moreover, such a chemical method is very important for the intensive research of chemical reactions involving graphene and the preparation of a graphene nanocomplex with other substances (polymers, nanoparticles, and the like) for actual use.

Although GO may be used as it is depending on the application, to utilize the inherent electrical and physical properties of graphene, the GO should be reduced by a physicochemical method.

The reagent used in the chemical reduction method is typically hydrazine-based. The reduction of an oxidized carbon material using a hydrazine-based reducing agent was already reported in 1999 when GO had not yet been researched. A graphite oxide is formed during the course of an oxidation process through which the interlayer distance of graphite is increased, at which time the conductivity can be increased by 26 times with the progression of reduction into hydrazine hydrate, according to a report. Later, as graphite oxide became available through the exfoliation of graphene, various types of hydrazine-based reducing agents have been researched. As alternative materials of a hydrazine-based reducing agent, hydroquinone and sodium borohydride were researched.

As environmentally friendly reducing agents, reducing agents such as ascorbic acid and glucose are reported. In addition, a method of inducing a deoxidation reaction through ordinary heating in a basic solution, distilled water, or an organic solvent such as dimethylformamide (DMF), dimethylacetamide, n-methylpyrrolidone (NMP) or inducing reduction within a short time of about 5 to 15 minutes using a microwave is being researched. Since GO may be reduced in a basic solution, in a supercritical solution, and even in a solvent, the chemical structure of GO should be carefully analyzed. In addition, the reduction may be effectively carried out through hydrogen-plasma treatment, and other methods include an electrochemical reduction method, a photocatalytic reduction method, a flash conversion method, and the like.

Figure 4:
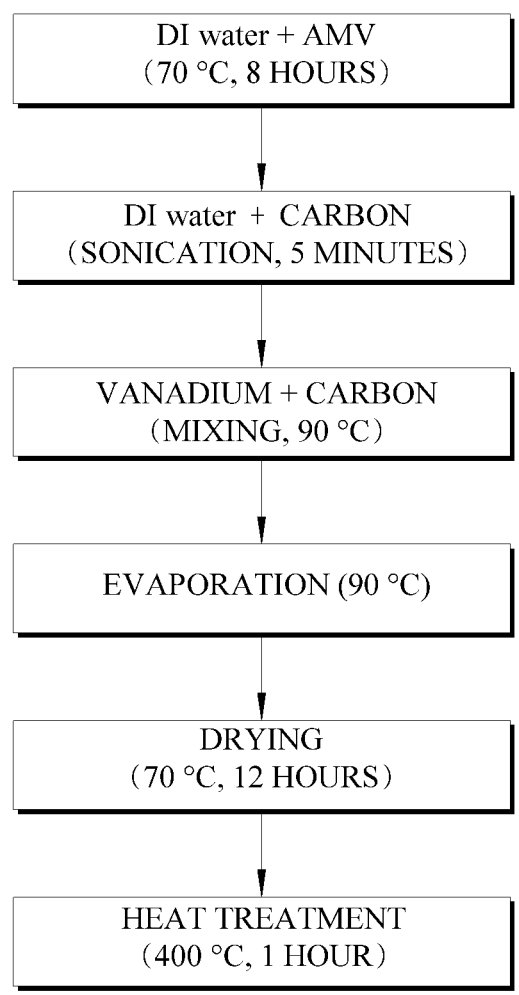
FIG. 4 is a flowchart for showing the order of processes in an evaporation method according to an exemplary embodiment of the present invention.
Figure 5:
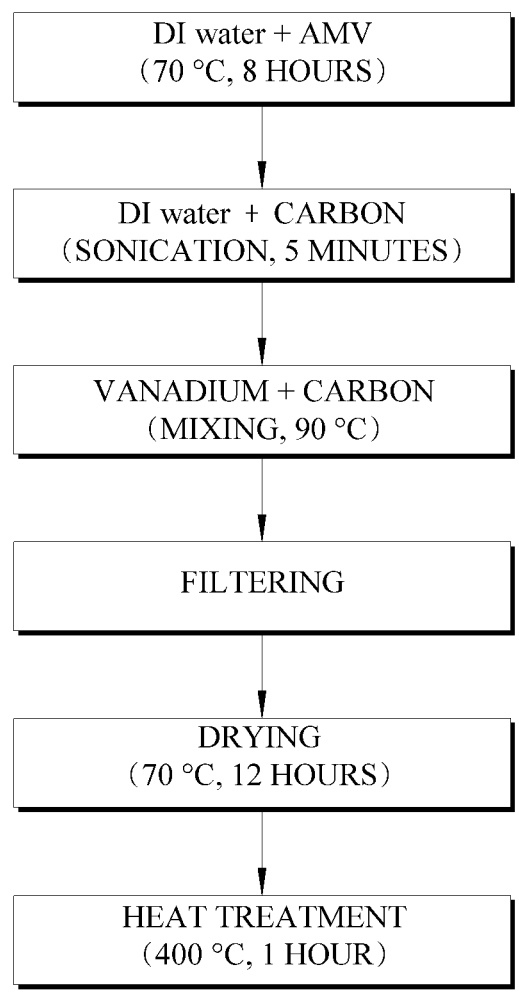
FIG. 5 is a flowchart for showing the order of processes in an impregnation method according to an exemplary embodiment of the present invention.
Figure 6:
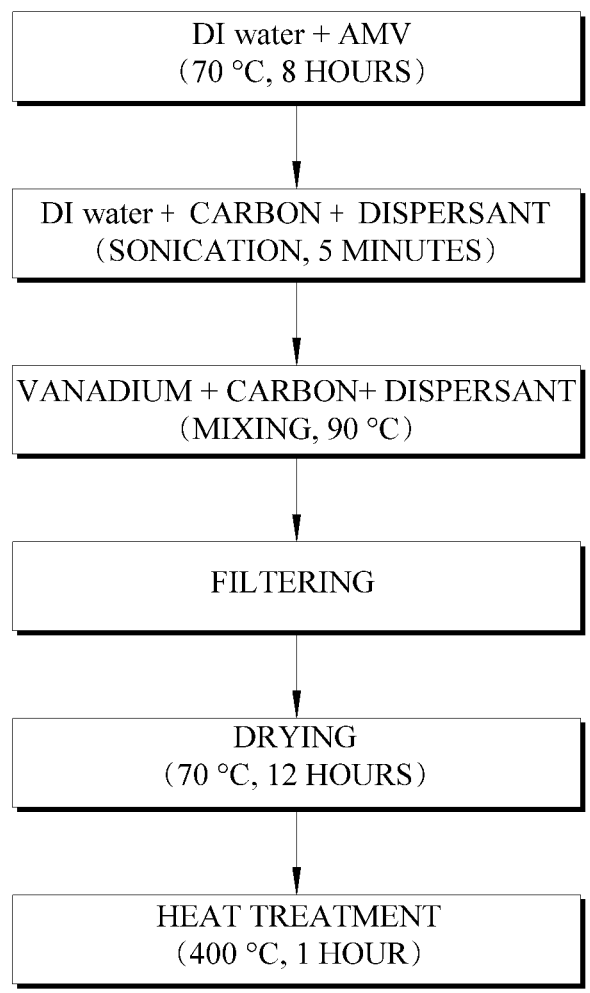
FIG. 6 is a flowchart for showing the order of processes in an impregnation method using a dispersant according to an exemplary embodiment of the present invention.

Hereinafter, the method of loading vanadium on a surface of a carbon material according to an exemplary embodiment of the present invention will be described. In the present invention, an evaporation method, an impregnation method, and an impregnation method that uses a dispersant are being applied. FIG. 4 is a flowchart for showing the order of processes in an evaporation method according to an exemplary embodiment of the present invention, FIG. 5 is a flowchart for showing the order of processes in an impregnation method according to an exemplary embodiment of the present invention, and FIG. 6 is a flowchart for showing the order of processes in an impregnation method using a dispersant according to an exemplary embodiment of the present invention.

Acid-treated GO and RGO were used as catalyst supports for an experiment. Meanwhile, although GO and RGO were used in the present invention, other carbon material exhibiting similar properties may be easily used by any one skilled in the art.

Among the above, the evaporation method will be described as the first method. The loading method included dispersing each of GO and RGO in deionized (DI) water for 5 minutes using a ultrasonic homogenizer, followed by measuring the amount of ammonium meta vanadate (AMV), which is a precursor, based on the weight of 0.25% V when preparing an SCR catalyst. Heating to a temperature of 90° C. was performed while stirring so that the DI water could be evaporated, and once the DI water was completely evaporated, the supported catalyst was dried for 12 hours at a temperature of 70° C. and then was heat-treated for 1 hour under a nitrogen atmosphere at 400° C. to prepare a catalyst.

The impregnation method will be described as the second method. The catalyst used for the experiment was the same as the catalyst support tested above, each of GO and RGO was dispersed in DI water through sonication for 5 minutes, the same amount (as in the previous method) of AMV was added to the DI water, and the mixture was stirred for 8 hours while heating to a temperature of 50° C. The supported catalyst was obtained using a vacuum filtration device, was placed and dried in a 70° C. oven for 12 hours, and then was reduced and sintered for 1 hour under a nitrogen atmosphere at 400° C. to prepare a catalyst.

The impregnation method that uses a dispersant will be described as the third method. BYK2010 and BYK2012 from Byk-Chemie GmbH were used as the dispersants. The test method included dispersing each of GO and RGO in DI water through sonication for 15 minutes, adding the dispersants while mixing by stirring and then adding AMV while heating to a temperature of 50° C. In this case, the loading ratio was determined by adding AMV with the use of the reducing agents and AMV without the use of the reducing agents to graphene. During the rest of the process, the supported catalyst was obtained using a vacuum filtration device in the same manner as in the previous method, was dried at a temperature of 70° C. for 24 hours, and then was heat-treated for 1 hour under a nitrogen atmosphere at 400° C. to prepare a catalyst.

Vanadium was loaded based on the volume ratio of vanadium with respect to graphene using one of the aforementioned methods. Since the burning out of graphene begins at about 300° C., the properties of an SCR catalyst prepared using the graphene loaded with vanadium were tested to examine the impact of pores created as a result of the burning out of graphene on the catalyst.

To determine the size and distribution of the vanadium particles loaded on graphene, a transmission electron microscope (JEM-2100F) was used, and the loading ratio was measured through TG/DTA.

The TEM analysis was conducted to determine the surface structure, size, distribution, and the like of a sample of graphene loaded with vanadium. Transmission electron microscopy refers to irradiating a sample with a focused beam of electrons and then magnifying, using an electron lens, the beam that has passed through the sample to obtain an image. Image contrast can be acquired through diffraction contrast and phase contrast that are formed when a sample is subjected to transmission, and a crystalline structural analysis based on diffraction is also possible. Although transmission electron microscopes have the same basic structure as optical microscopes, transmission electron microscopes improve the resolution by utilizing an electron beam with a short wavelength, rather than a long wavelength, and utilize an electron lens capable of focusing like an optical lens by making use of the magnetic properties of electrons.

To investigate the thermal behavior of a sample of graphene loaded with vanadium, the TG/DTA analysis was conducted. Thermogravimetry (TG) continuously records the mass of a sample as a function of temperature or of time at a fixed pressure, wherein the mass changes due to an increase or decrease in temperature. The resulting graph is referred to as a plot thermo diagram of mass or mass % as a function of time or a thermal decomposition curve. Differential thermal analysis (DTA) measures a temperature difference between a sample and a reference material while heating the two materials with an identical heat source. Since ΔT equals to T(reference material) minus T(sample), the DTA curve plots ΔT as a function of temperature. A positive peak appears during an exothermic reaction, and a negative peak appears during an endothermic reaction. Since the ΔT measured through DTA varies by the resistance to a heat flow, sample properties, and the like, it is challenging to directly calculate the energy. Therefore, DTA is used as a qualitative or semi-quantitative method.

Figure 7:
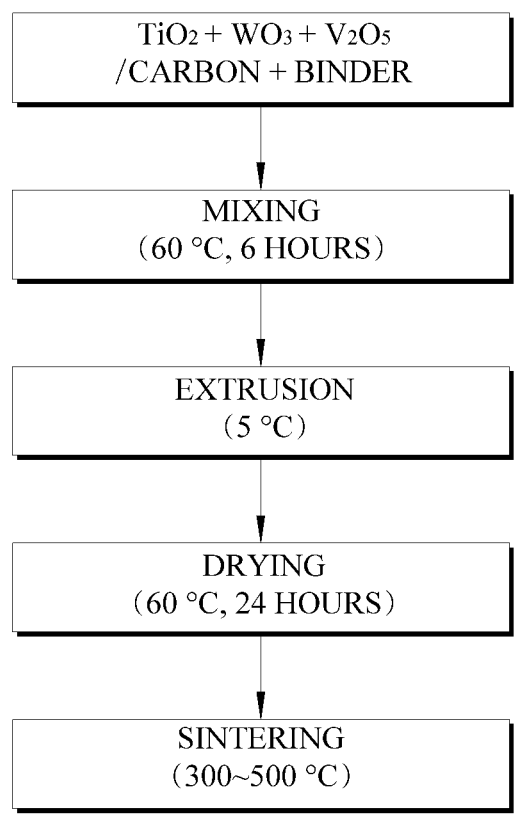
FIG. 7 is a flowchart for illustrating a method of preparing an SCR catalyst according to an exemplary embodiment of the present invention.

By utilizing graphene that is loaded with vanadium, a $TiO_2$-based, honeycomb-type, 1-inch, 9-cell SCR catalyst was prepared. FIG. 7 is a flowchart for illustrating a method of preparing an SCR catalyst according to an exemplary embodiment of the present invention.

The catalyst was prepared using, instead of vanadium, a supported catalyst having a certain ratio of vanadium with respect to the volume of graphene, and various organic binders, inorganic binders, and surfactants were used. In addition, to investigate the impact of graphene on the SCR catalyst, a catalyst was prepared only using vanadium, without using graphene, under the same conditions.

Clay was mixed for about 5 hours using an open kneader while heating to a temperature of 85° C., and the clay was extruded using a vacuum extruder. The pores contained in clay were reduced by extruding the clay several times in a vacuum, and several catalysts with a common composition ratio were extruded to examine the catalyst activity due to the burning out of graphene as a function of sintering temperature. Each catalyst that had been extruded was covered with a plastic wrap and then was dried for 24 hours in a 70° C. constant temperature and humidity chamber, and each of the SCR catalysts with a common composition ratio was sintered at a temperature in the range of 300° C. to 500° C.

Hereinafter, carbon materials loaded with vanadium prepared as described and the results of testing the properties of SCR catalysts prepared based on the carbon materials will be described.

The crystalline structure and the like of a sample may be determined through the XRD analysis based on a phenomenon in which X-rays diffract and interfere within the sample, and the XRF analysis is based on the fact that each chemical element has a unique energy and that, when the x-rays are irradiated on a sample at a predetermined take-off angle between the x-ray source and the sample to be measured, the unique energy of each element reacts to generate secondary x-rays (x-ray photons), which are collected by a detector. The photons collected by the detector are determined by a multichannel analyzer (MCA) to produce into spectra (peaks), and can be qualitatively and quantitatively analyzed using software. The XRD analysis and the XRF analysis were conducted on SCR catalysts that have been prepared, in order to determine crystalline structure, composition, and content based on the analytical results. The 2θ value was measured within the range of 0 to 90° at a scan speed of 6°.

When a stub columns specimen made of a brittle material is subjected to a compression test, a vertical crack fracture, a granular fracture, a diagonal shear fracture, or the like occurs. The value obtained by dividing the normal stress, which is applied on the cross-section upon a compression fracture, i.e., the compressive load applied at the moment, by the cross-sectional area is referred to as the compressive strength of a brittle material. However, unlike a tensile test, the compression test is not limited by a premise that the material should be always destroyed. Therefore, the compression yield point may replace the compressive strength.

The impact of graphene on strength when graphene loaded with vanadium was used for an SCR catalyst was investigated. Supported catalysts with varying volumes of loaded vanadium were sintered at one of 300° C., 400° C., and 500° C., and were analyzed through comparison with the standard catalyst that does not contain added graphene.

Each catalyst was prepared into a 1-inch cube (2.54 cm×2.54 cm×2.54 cm), and strengths thereof in each of a crosswise direction and a lengthwise direction were measured.

Since a flue gas from a power plant contains various types of particulate matter (PM) such as dust, ash, and the like, the flue gas may affect a front portion of a catalyst when passing by. Also, since the catalyst mounting unit in a power plant is bent at a 90° angle, side flows are generated, eroding only one side of the catalyst. Therefore, the abrasion resistance and strength according to catalyst conditions should be analyzed. To investigate an impact of carbon in a prepared catalyst on the abrasion resistance, supported catalysts with varying volumes of loaded vanadium were sintered at one of 300° C., 400° C., and 500° C., were prepared into a 10-cm long cuboid (2.54 cm×2.54 cm×10 cm), and were analyzed through comparison with the standard catalyst. Silicon sand was used as the abrasive material, and the flow rate and discharge rate thereof were selected based on the following Mathematical Equation 1. The outer walls of the catalysts were sufficiently wrapped with ceramic strands so that the silica sand could properly pass through the interior of the catalysts. The abrasion test of each catalyst was conducted for 30 minutes at a temperature of 70° C., a flow rate of 90 m³/h, and a discharge rate of 10 kg/h.

LV(Lame Velocity)×Cross sectional area

Flow rate×Particle concentration

Erosion rate (%){(weight of before=weight of later)/ (weigh of before)}×100(%)     [Mathematical Equation 1]

The SCR catalysts prepared by including graphene loaded with vanadium were analyzed in terms of the catalyst surface structure that changes with the heat treatment temperature and the properties and composition affected by the particles size, by utilizing a field emission scanning electron microscope (FE-SEM, Hitachi, SU8020) equipped with an energy dispersive x-ray (EDX) spectrometer.

Scanning electron microscopy (SEM) was developed more recently, and irradiates a surface of a sample with a well-focused electron beam, rather than allowing electrons to pass through the specimen. When the electron beam that has been irradiated is focused on a single spot on the specimen, only the primary electrons are refracted and the secondary electrons generated from the surface are collected by a detector. The resulting signals are gathered from several spots and form an image on a cathode ray tube.

The SEM analysis of the SCR catalysts was conducted for varying contents of loaded vanadium and for varying sintering temperatures, and was conducted by applying a conductive Pt coating and irradiating at 15 kV. To determine the specific surface area, pore volume, pore size, and the like of the SCR catalysts prepared using a carbon material loaded with vanadium, the nitrogen adsorption-desorption isotherms analysis was conducted using a surface area analyzer (ASAP 2020, Micromeritics Instrument Co., USA). The comparison of the SCR catalysts prepared using a vanadium-loaded carbon material with the standard catalyst and the investigation of an impact of the sintering temperature, which affects carbon removal, on the specific surface area were intended. The pretreatment conditions were variously set depending on the sintering temperature (300° C., 400° C., and 500° C.). In the case of the catalysts to be sintered at 300° C., the temperature was raised to 200° C. at a rate of 10° C./min and a pretreatment was performed for 5 hours. In the case of the catalysts to be sintered at 400° C. or 500° C., the temperature was raised to 300° C. at a rate of 10° C./min and a pretreatment was performed for 4 hours. For the analysis, 0.5 g of each catalyst was used, and the specific surface area, pore volume, and pore size were measured within the relative pressure (P/P.) range of 0.05 to 0.3. The specific surface area was determined by the Brunauer, Emmett & Teller (BET) method, and the pore size distribution and pore volume were obtained using the Barrett, Joyer & Hanlenda (BJH) method and the Kelvin Equation.

The conversion of $SO_2$ into $SO_3$, which corresponds to a side reaction of the SCR process, is a reaction to be inhibited. Ammonium sulfate $((NH_4)_2SO_4)$ and ammonium persulfate $(NH_4HSO_4)$ which are produced as $SO_3$, which is obtained through the oxidation of $SO_2$ among the components in the exhaust, reacts with unreacted ammonia in the exhaust are main causes of reduced activity by being accumulated in the pores of an SCR catalyst. In addition, such products adhere not only to the catalyst but also to a pipe and other devices downstream of the catalyst such that they limit the flow thereof. The SOx conversion ratio was measured under conditions in accordance with the standard set forth in the VGB Guideline to estimate the length of a catalyst at the area velocity (AV) of 10 m/hr and at the measurement temperature of 380° C., NO gas (gas data) at 300 ppm (v/v) was allowed to flow in a qualitative manner, and $SO_2$ gas (gas data) at 500 ppm (v/v) was allowed to flow. The concentration of $O_2$ (gas concentration) was maintained at 5% (v/v) and the concentration of $H_2O$ was maintained at 10% (v/v), and $N_2$ (gas data) was used to maintain the total flow rate. The reaction gases other than $O_2$ were analyzed using FT-IR (CX4000, Gasmet™), and $O_2$ gas was analyzed using an $O_2$ analyzer (OXITEC® 5000, ENOTEC GmbH). The SOx conversion ratio is calculated based on the difference in concentration between the $SO_2$ injected after stabilization and the $SO_3$ released after a sufficient reaction between the catalyst and the gas.

The NOx conversion testing equipment is configured of a catalyst reaction unit where the catalyst is installed and a reaction occurs, a heater that controls the temperature of the catalyst reaction unit, a pre-heater that preheats the injected gas, a temperature control panel that controls the temperature and the amount of injected gas, a mass flow controller (WC), a water pump, and the like. The temperature of the reactor was controlled to the range of 250 to 400° C., and the catalyst to be analyzed was prepared into the size of 1 inch (2.54 cm, 3×3 cell) both vertically and horizontally. The length of a catalyst was estimated at the surface velocity (SV) of 9,134 $h^{-1}$ and at the AV of 25 m/h, based on the standard set forth in the VGB Guideline, which has been used in Europe, Japan, the US, and the like as a standard of denitrification catalyst performance assessment since 2005. Also, the gas to be supplied into the reactor was supplied at the total gas volume of 20 L, again based on the standard set forth in the VGB Guideline. NO gas (gas data) at 300 ppm (v/v) was allowed to flow in a qualitative manner, and $SO_2$ gas (gas data) at 500 ppm (v/v) and $NH_3$ gas at 300 ppm (v/v) were allowed to flow. The concentration of $O_2$ (gas concentration) was maintained at 5% (v/v) and the concentration of $H_2O$ was maintained at 10% (v/v), and $N_2$ (gas data) was used to maintain the total flow rate. To accurately carry out an activity test, stabilization was performed under the corresponding reaction conditions for a certain time and then a reaction experiment was conducted. The reaction gases other than $O_2$ were analyzed using FT-IR (CX4000, Gasmet™), and $O_2$ gas was analyzed using an $O_2$ analyzer (OXITEC® 5000, ENOTEC GmbH).

The loading of vanadium (AMV) carried out by different loading methods was examined. According to the result, in the case of the evaporation method, the grain growth of vanadium in the form of whiskers was found regardless of the material (GO or RGO), and it is thought that the grain growth of vanadium occurred due to the heat (90° C.) that was applied to evaporate the mixed solution. In addition, when vanadium was loaded on graphene (GO/RGO) by the impregnation method that is based on simple filtering and does not involve heating to prevent grain growth, it was found that vanadium particles were loaded on GO in an agglomerated manner, and that a small amount of vanadium was loaded on a surface of RGO in a partly agglomerated manner and had nano-sized particles with a size of about 20 to 30 nm. Hence, when vanadium was loaded by the impregnation method using a dispersant to prevent the agglomeration of vanadium particles, the loading of vanadium particles was found on the overall surface of RGO, without agglomeration and grain growth on the surface. Due to the surface active properties, the dispersant functions to prevent the agglomeration of vanadium particles by dispersing them. Based on a TEM image, it was found that vanadium is distributed with an average particle size of 20 to 30 nm and is loaded on overall RGO.

Figure 8:
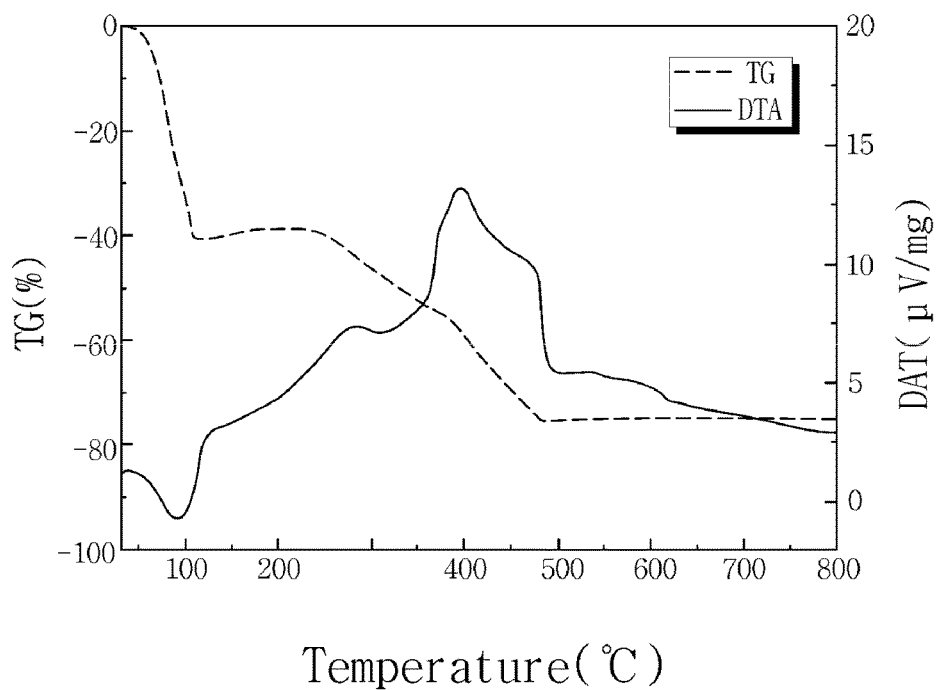
FIG. 8 is a graph for comparing loading ratios according to a method of loading vanadium according to an exemplary embodiment of the present invention.

TG/DTA was conducted to analyze the thermal behavior of graphene (GO, RGO) (see FIG. 8). Based on the result, it was found that the weight of graphene steadily decreased to about 120° C., was maintained for a certain period of time at higher temperatures, and then again decreased from 250° C. to about 500° C. It is determined that the result for the temperature of up to 120° C. was obtained because of weight reduction due to the evaporation of moisture, and that the result from 250° C. through 500° C. was due to the combustion of graphene and an additive(s).

Figure 9:
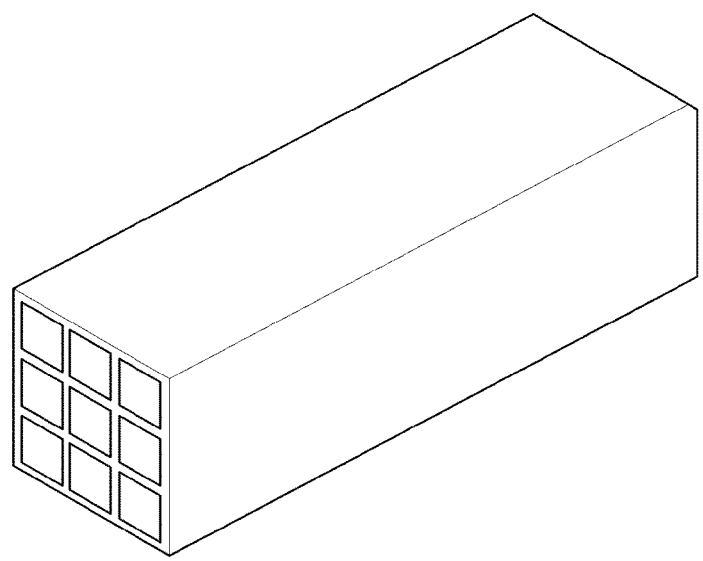
FIG. 9 is a perspective view of an SCR catalyst according to an exemplary embodiment of the present invention.
Figure 10:
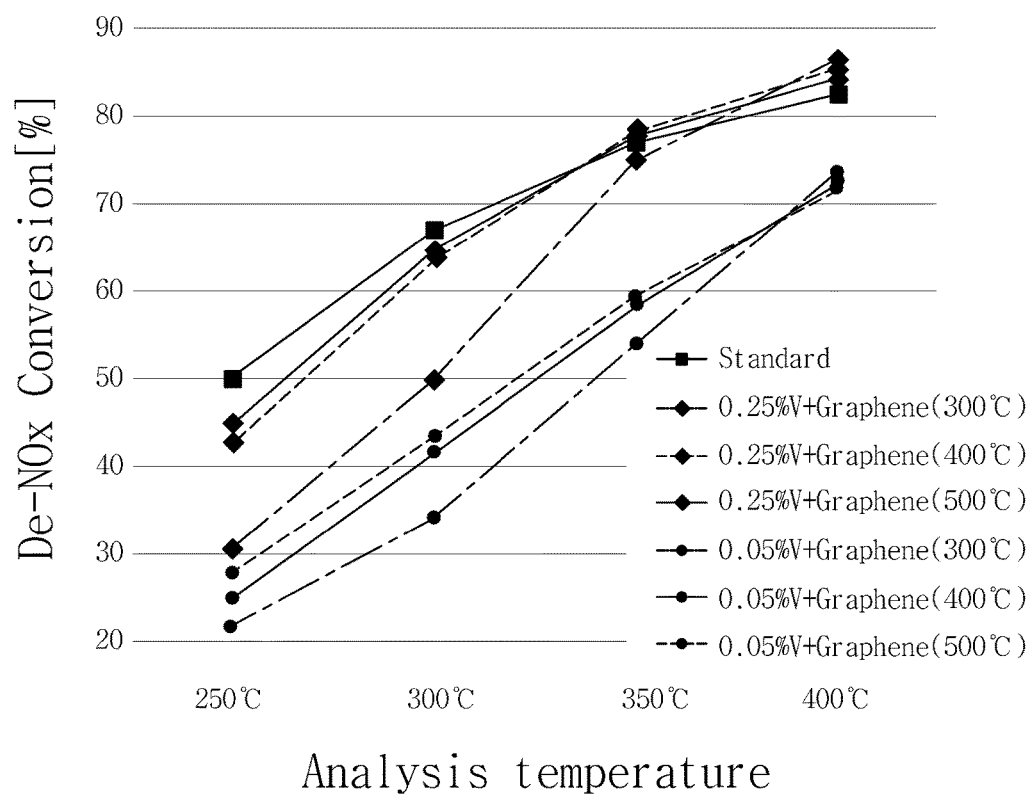
FIG. 10 is a graph for providing the results of denitrification performance assessment conducted on SCR catalysts according to an exemplary embodiment of the present invention.

FIG. 9 and FIG. 10 are respectively a structure of an SCR catalyst according to an exemplary embodiment of the present invention and a graph for providing the results of denitrification performance assessment conducted on various exemplary SCR catalysts.

In the present invention, a standard SCR catalyst that is based on $V_2O_5$—$WO_3$—$TiO_2$, contains vanadium at 0.5 wt %, and does not include added graphene was prepared based on commercial catalysts in order to conduct a comparative assessment according to the addition of graphene. The prepared SCR catalyst measures 1 inch both horizontally and vertically, and has a cell density of 9 cells per square inch (cpsi), a length of about 30 cm, and a cell inner wall thickness of about 1 mm. On the basis of the standard SCR catalyst (0.5 wt %) that had been prepared, SCR catalysts containing RGO loaded with vanadium were prepared, each with the vanadium content of 0.25 wt % and 0.05 wt %. In addition, to examine the temperature-dependent behavior of the catalysts with different vanadium contents, sintering was performed at each of 300° C., 400° C., and 500° C.

SCR catalysts with different vanadium contents were prepared, and they were classified again according to the sintering temperature. Based on the result, it can be found that the colors of catalysts vary by the vanadium content and are affected by the sintering temperature, and that the color of the catalyst sintered at 500° C. is darker compared to the catalyst sintered at 300° C., since most of the graphene burns out at the sintering temperature of 500° C.

To analyze the thermal behavior of SCR catalysts at temperatures other than 380° C., which is the activation temperature of vanadium-based catalysts, the denitrification performance and the SOx conversion ratio were evaluated at 250° C., 300° C., 350° C., and 400° C. by further narrowing down the temperature interval, and the result of the denitrification performance assessment is provided in the graph of FIG. 10. Although the highest efficiency of about 50% was observed with the standard catalyst at a low analytical temperature of 250° C., when the analysis was performed at a higher temperature, the catalyst containing RGO loaded with 0.25 wt % vanadium exhibited higher denitrification efficiency compared to the standard catalyst. At the analytical temperature of 400° C., the standard catalyst and the catalyst containing RGO loaded with 0.25 wt % vanadium exhibited a denitrification efficiency of 80% or more, and the catalyst containing RGO loaded with 0.05 wt % vanadium exhibited a denitrification efficiency of 70%. In addition, at the analytical temperature of 250° C., the higher sintering temperature led to the higher denitrification efficiency, but, as the analytical temperature increased, the catalyst sintered at a temperature of 300° C. exhibited higher denitrification efficiency compared to the catalyst sintered at a temperature of 500° C. The crystallization temperature of $V_2O_5$ is 300° C. or more, and it seems that the denitrification efficiency rapidly increases at the analytical temperature of 300° C. or more due to the crystallization of $V_2O_5$ that simultaneously occurs. It is considered that the reason of the higher denitrification efficiency as compared to the standard catalyst despite the lower content of $V_2O_5$, which acts as an activator, is that vanadium in the form of a precursor was loaded on RGO, reducing the size of $V_2O_5$ that crystallized, thus increasing the specific surface area, and thereby enabling functioning as an activator.

The strength and abrasion resistance of the SCR catalyst are becoming more important in power plants, which are stationary pollution sources, because of a harsh operational environment and the use of low-quality coal for cost reduction. In the case of mobile pollution sources such as vessels and automobiles, catalyst miniaturization and strength are becoming more important due to the problems associated with confined spaces and external shocks during operation. In addition, since SCR catalysts may experience external vibrations or impacts during casing, transportation, mounting, demounting, and the like and may be subject to physical damage caused by the fly ash in the exhaust and damage caused by side flows, the strength and abrasion resistance of catalysts are becoming as important as the denitrification efficiency.

Figure 11:
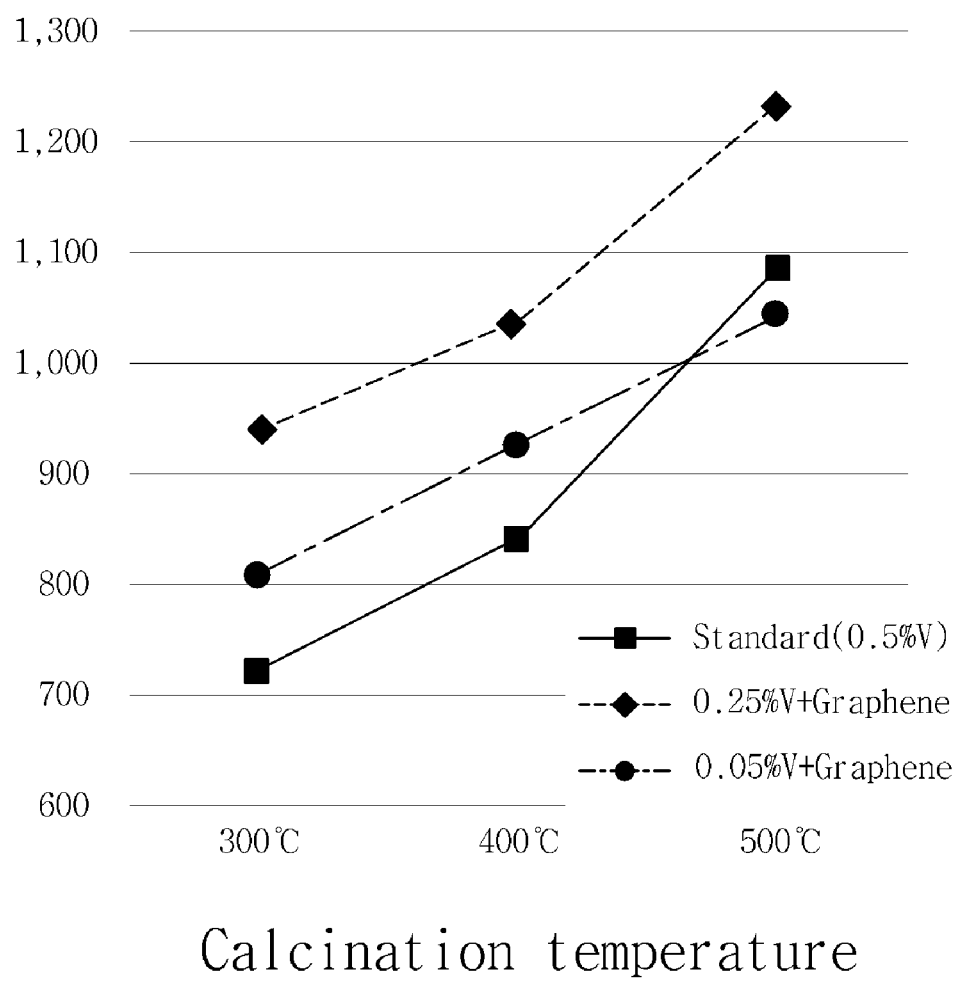
FIGS. 11 and 12 are graphs for providing the results of compressive strength measurement of SCR catalysts according to an exemplary embodiment of the present invention.
Figure 12:
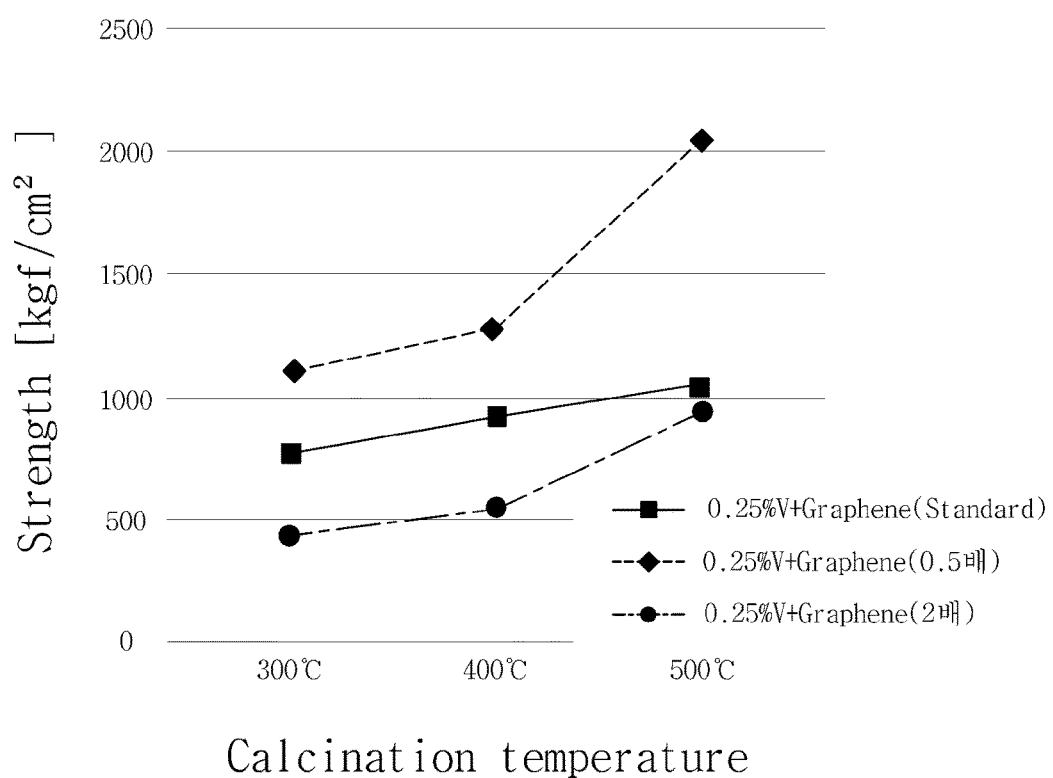
Figure 13:
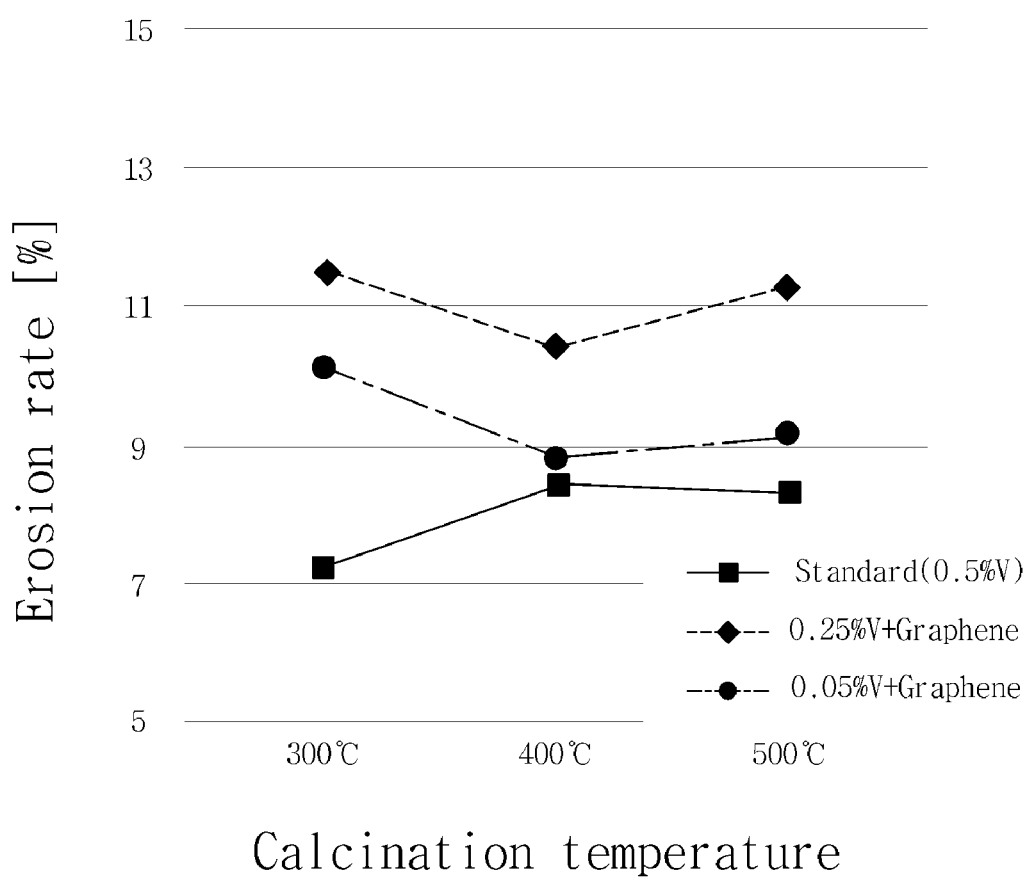
FIG. 13 is a graph for providing the result of abrasion resistance measurement of SCR catalysts according to an exemplary embodiment of the present invention.

Each of the standard SCR catalyst, the SCR catalyst containing RGO loaded with 0.25 wt % vanadium, and the SCR catalyst containing RGO loaded with 0.05 wt % vanadium that had been prepared was cut into the shape of a cube, and the compressive strength of each catalyst was determined by measuring the force applied to the point at which the catalyst was destroyed. The results are provided in FIG. 11. The compressive strengths of the standard SCR catalyst, the SCR catalyst containing RGO loaded with 0.25 wt % vanadium, and the SCR catalyst containing RGO loaded with 0.05 wt % vanadium, all of which were sintered at 500° C., were 1082 kgf/cm$^2$, 1230 kgf/cm$^2$, and 1038 kgf/cm$^2$ respectively, indicating that the addition of RGO to an SCR catalyst leads to an improvement in strength. In addition, for SCR catalysts containing RGO loaded with 0.05 wt % vanadium, wherein the RGO content was halved or doubled compared to the previous SCR catalyst containing RGO loaded with 0.05 wt %, the compressive strengths were measured. The results are provided in FIG. 12, and the compressive strength tends to be higher with a higher RGO content. It is considered that the higher strength compared to the standard catalyst was due to the reinforcing function of the graphene included in the SCR catalyst, since graphene is a material with a very high strength, which is as high as about 200 times the strength of steel. Erosion rates were calculated and the result is provided in FIG. 13. As shown in the graph, the standard catalyst, the SCR catalyst containing RGO loaded with 0.25 wt % vanadium, and the SCR catalyst containing RGO loaded with 0.05 wt % vanadium exhibited an erosion rate of about 8%, about 10%, and about 9%, respectively. It seems that the lower abrasion resistance compared to the standard catalyst is due to the presence of cracks on the inner walls of the catalysts, which led to a large degree of abrasion caused by the abrasive sand ($SiO_2$) for an analysis use that passed by.

Figure 14:
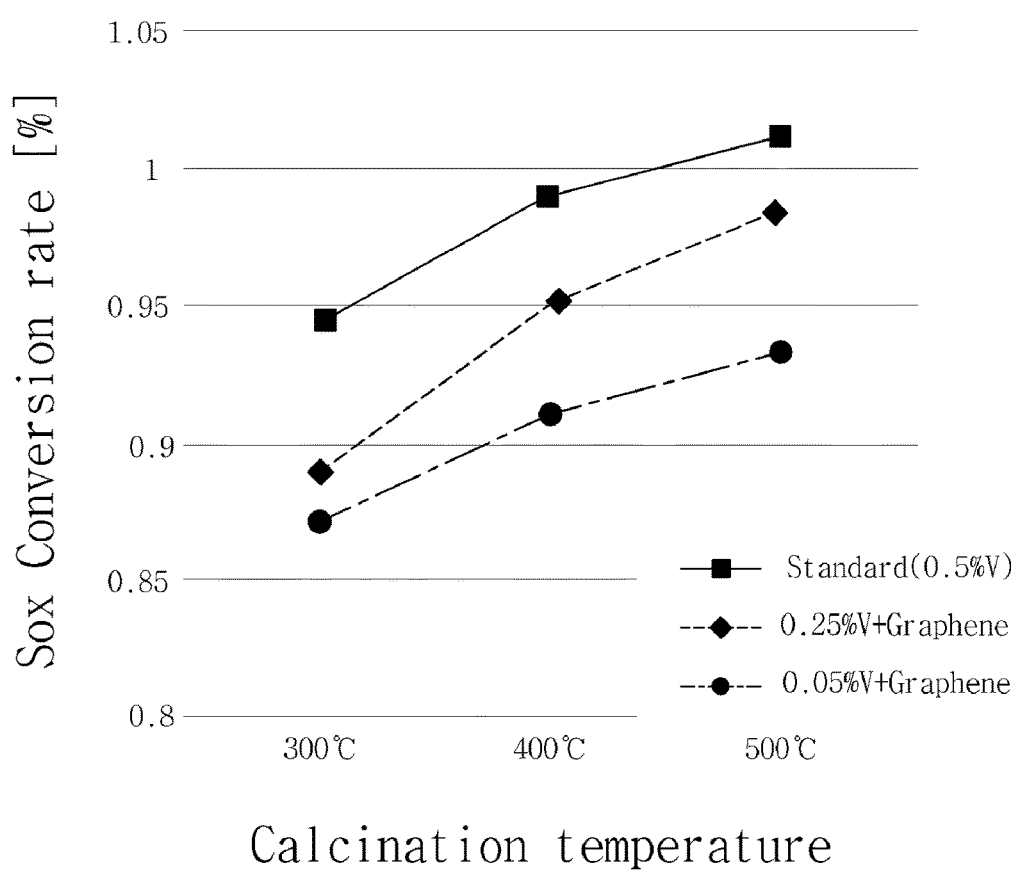
FIG. 14 is a graph for providing the SOx conversion ratio of SCR catalysts according to an exemplary embodiment of the present invention.

FIG. 14 is a graph for providing an SOx conversion ratio of SCR catalysts according to an exemplary embodiment of the present invention.

Through a side reaction of an SCR process of a catalyst phase, the $SO_2$ emitted during the combustion of fossil fuels is converted into $SO_3$, which reacts with ammonia (injected as a reducing agent) and moisture at a temperature of 300° C. or less to produce highly corrosive ammonium sulfate and sulfuric acid in the form of solid ammonium sulfate or liquid ammonium bisulfate. Liquid ammonium bisulfate among the various types of ammonium sulfate, is accumulated into the micropores of a catalyst due to a capillary force, causing deactivation that reduces catalyst activity, in addition to being immersed at the back of the SCR catalyst to cause corrosion and a pressure loss in the SCR system, thus sometimes causing serious adverse effects on facility efficiency. Therefore, SOx conversion is a reaction to be inhibited. The gas concentration and the flow rate were controlled as in the conditions of denitrification performance assessment, and aging was conducted for 24 hours or more to make the conditions the same as those of commercial catalysts.

To compare the inlet $SO_2$ concentration and the outlet $SO_3$ concentration, an exhaust in the amount of 100 L was allowed to flow into a condenser, and the condenser was maintained at 95° C. so that the condenser could collect $SO_3$. Once the $SO_3$ that had been collected after allowing the 100 L exhaust to flow into the condenser is washed with distilled water, it becomes an $SO_4$ ion, which is subjected to IC for determining the SOx conversion ratio. For each catalyst, the IC was conducted 3 times to find the average, and the results are provided in FIG. 14.

Higher vanadium content also leads to a higher SOx conversion ratio. As shown in FIG. 14, the standard catalyst had the highest SOx conversion ratio. It is considered that using RGO for an SCR catalyst does not have any impact on the SOx conversion ratio, and it was found that lower vanadium contents compared to those of conventional, commercial SCR catalysts led to the reduction in the SOx conversion ratio.

Figure 15:
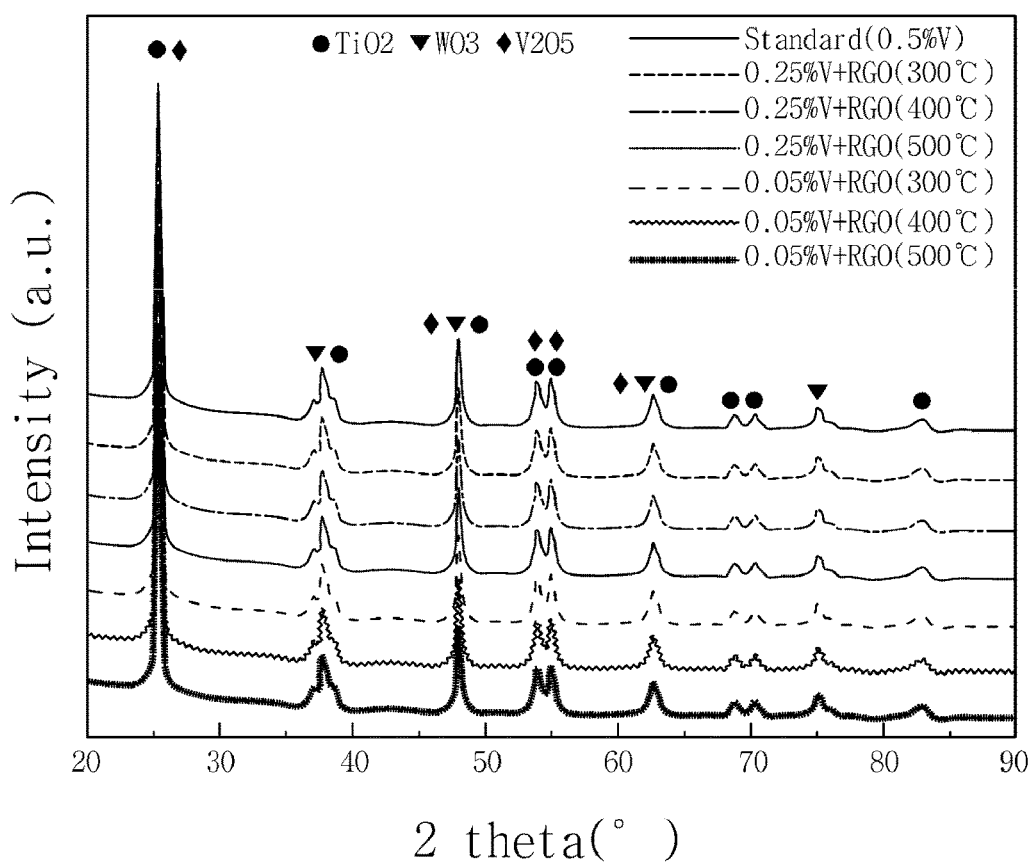
FIG. 15 is a graph for providing the results of XRF and XRD performed on SCR catalysts according to an exemplary embodiment of the present invention.

FIG. 15 is a graph for providing the results of XRF and XRD performed on SCR catalysts according to an exemplary embodiment of the present invention.

The chemical composition of the standard catalyst, the SCR catalyst containing RGO loaded with 0.25 wt % vanadium, and the SCR catalyst containing RGO loaded with 0.05 wt % vanadium were analyzed and the results are provided in the following Table 1. It was found that all of the SCR catalysts based on $V_2O_5$—$WO_3$/$TiO_2$ showed similarity in terms of the content of tungsten oxide ($WO_3$), which is a co-catalyst, and in terms of the content of $TiO_2$, which functions as a catalyst support. The vanadium ($V_2O_5$) contents of 0.25% V and 0.05% V were found with small errors. In addition, the XRD analysis was conducted to determine the crystalline structure according to the sintering temperature, and the crystalline phase of $TiO_2$ and the presence of $V_2O_5$ could be identified.

TABLE 1

| | Standard (0.5 wt % V) | 0.25 wt % V + graphene | 0.05 wt % V + graphene |
|---|---|---|---|
| $Na_2O$ | 0.05 | 0.07 | 0.08 |
| MgO | 0.18 | 0.17 | 0.22 |
| $Al_2O_3$ | 1.86 | 1.72 | 1.99 |
| $SiO_2$ | 7.54 | 1.72 | 9.1 |
| $P_2O_3$ | 0.04 | 0.05 | 0.04 |
| $SO_3$ | 1.05 | 1.42 | 1.41 |
| $K_2O$ | 0.04 | 0.03 | 0.04 |
| CaO | 2.15 | 2.05 | 2.15 |
| $TiO_2$ | 78.7 | 78.7 | 78.0 |
| $V_2O_5$ | 0.50 | 0.24 | 0.04 |
| $Fe_2O_3$ | 0.35 | 0.26 | 0.40 |
| SrO | 0.03 | 0.03 | 0.03 |
| $Nb_2O_5$ | 0.02 | 0.02 | 0.02 |
| $WO_3$ | 7.36 | 7.40 | 7.10 |

$TiO_2$ has three types of crystalline structure such as brookite, anatase, and rutile, and anatase among them is a semi-stable phase that transitions into the stable rutile phase when thermal energy is applied from an external source. However, since a process takes place on a surface during an SCR reaction, the anatase phase exhibiting a larger specific surface area is more appropriate. Therefore, the phase transition of $TiO_2$ from the anatase phase into the rutile phase due to a thermal operation acts as a very important factor. In addition, the phase transition of $TiO_2$ gradually takes place at 600° C. or more, and the phase transition from the anatase phase into the rutile phase rapidly takes place at 730° C. or more. As can be seen from the result provided in FIG. 15, the phase transition of $TiO_2$ crystals from anatase to rutile was not observed at a sintering temperature ranging from 300 to 500° C., and it can be found from the $V_2O_5$ peak and the $WO_3$ peak that the $V_2O_5$ phase and the $WO_3$ phase are orthorhombic.

Meanwhile, the FE-SEM analysis was conducted to observe the surface and particle size of SCR catalysts that change according to the heat treatment temperature. In addition, the surface of the SCR catalysts containing graphene loaded with vanadium was observed to study how the addition of graphene affects catalyst changes and particle sizes. The result shows that the particle size of the SCR catalysts increased, through agglomeration, as the sintering temperature increased from 300° C. to 500° C., and that the standard catalyst sintered at 300° C. contained agglomerations of very fine particles. Such results are associated with the high denitrification efficiency that was observed during the denitrification performance assessment at a low temperature (250° C.).

In addition, it was found that the particle size of the SCR catalyst containing RGO loaded with 0.25 wt % vanadium and the SCR catalyst containing RGO loaded with 0.05 wt % vanadium was larger when the catalysts were sintered at 300° C., compared to the size of the particles obtained through sintering at 400° C. or 500° C. It is considered that such particles are formed because graphene, which does not burn out at 300° C. and has a large particle size, agglomerated with the raw materials of the SCR catalysts. Therefore, within the temperature range of 400 to 500° C. at which graphene completely burns out, the formation of particles smaller than those of the standard catalyst was found, followed by the coarsening of gathered particles.

Figure 16:
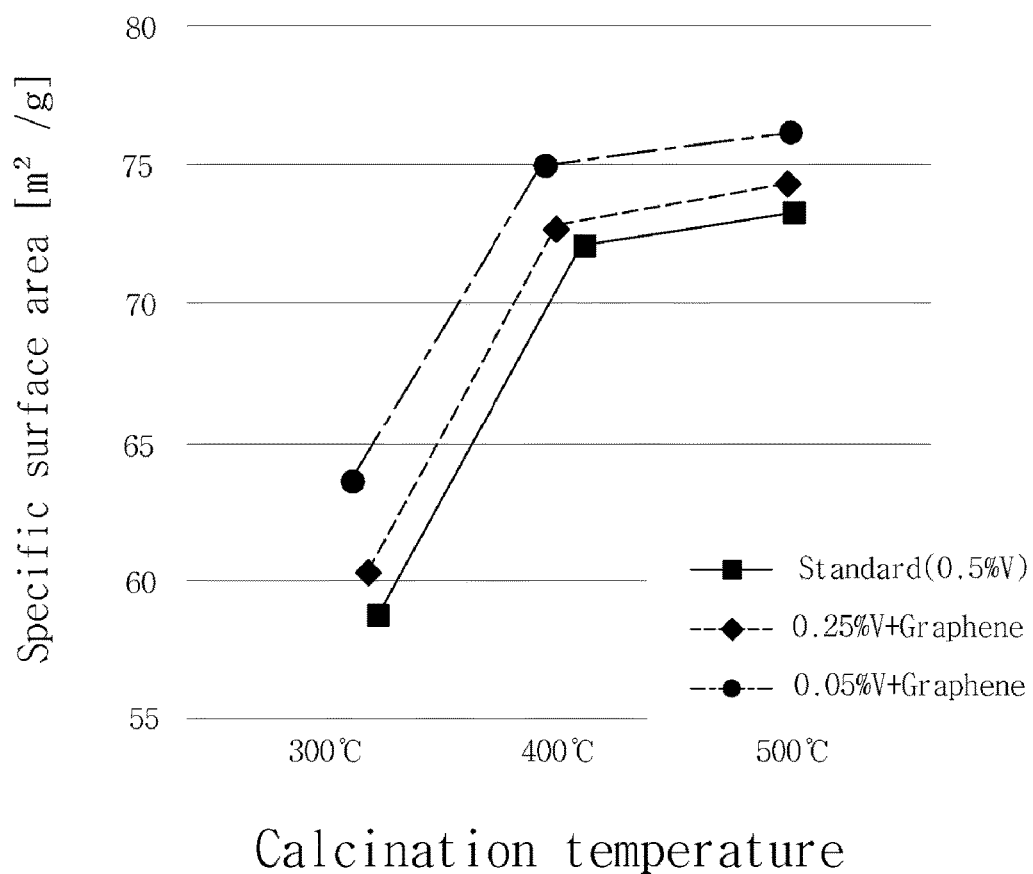
FIG. 16 is a graph for providing the results of a BET test performed on SCR catalysts according to an exemplary embodiment of the present invention.

FIG. 16 is a graph for providing the results of a BET test performed on SCR catalysts according to an exemplary embodiment of the present invention.

The SCR catalyst reaction is a surface reaction, and the specific surface area is also being considered as an important factor in SCR catalyst activity. Vanadium dispersity improves with a larger specific surface area, and also in the case of $TiO_2$ having a higher specific surface area, the sintering of anatase or the phase transition of anatase into rutile takes place at a lower temperature compared to $TiO_2$ with a lower specific surface area. The specific surface area, pore volume, and pore size were analyzed by preparing the standard SCR catalyst, the SCR catalyst containing RGO loaded with 0.25 wt % vanadium, and the SCR catalyst containing RGO loaded with 0.05 wt % vanadium to examine the impact of adding graphene to an SCR catalyst, as well as to investigate the specific surface area, pore volume, pore size, and the like as a function of the heat treatment temperature. The analysis was carried out using the ASAP 2010 (Micromeritics Instrument Co., USA) device. Heat treatment temperatures and the specific surface area of the SCR catalysts containing graphene loaded with vanadium at varying amounts are provided in FIG. 21, and the pore volume and pore size of the SCR catalysts are provided in the following Table 2 and Table 3, respectively.

TABLE 2

|  | 300° C. | 400° C. | 500° C. |
|---|---|---|---|
| Standard (0.5 wt % V) | 0.20 | 0.21 | 0.22 |
| 0.25 wt % V + graphene | 0.20 | 0.22 | 0.22 |
| 0.05 wt % V + graphene | 0.21 | 0.23 | 0.22 |

TABLE 3

|  | 300° C. | 400° C. | 500° C. |
|---|---|---|---|
| Standard (0.5 wt % V) | 14.3 | 13.6 | 13.7 |
| 0.25 wt % V + graphene | 14.7 | 13.8 | 14.3 |
| 0.05 wt % V + graphene | 12.9 | 12.7 | 12.3 |

It was found that the specific surface area increased with the addition of graphene, and the specific surface area increased with an increasing sintering temperature. It is considered that such results are obtained because of the $TiO_2$ particles, $V_2O_5$ particles, $WO_3$ particles, and the like, which had been agglomerated with large graphene particles upon sintering at a temperature of 300° C., were formed into minute particles of $TiO_2$, $V_2O_5$, and $WO_3$, and into pores among the particles as a result of the burning out of graphene during sintering at a temperature of 400° C. or 500° C.

In addition, based on the results of analyzing pore volumes and pore sizes and comparing to the standard catalyst, the pore volume values were similar without much difference, and the SCR catalyst containing RGO loaded with 0.25 wt % vanadium exhibited the largest pore size, which is considered as the reason of the largest efficiency of the SCR catalyst containing RGO loaded with 0.25 wt % vanadium sintered at 400° C. among the denitrification efficiency results.

While the exemplary embodiments of the present invention have been described above, the present invention may cover various changes, modifications, and equivalents. It is clear that the present invention may equally encompass suitable modifications of the exemplary embodiments. Therefore, the disclosed contents do not limit the scope of the present invention defined by the scope of the appended claims.

INDUSTRIAL APPLICABILITY

The present invention can be applied to the preparation of an SCR catalyst.

The invention claimed is:

1. A method of preparing a selective catalytic reduction (SCR) catalyst, the method comprising:
    a first process of preparing a mixture of a vanadium ($V_2O_5$) and tungsten oxide ($WO_3$)-supported catalyst with titanium dioxide ($TiO_2$);
    a second process of preparing an extrusion of the mixture by extruding the mixture into a desired shape using a vacuum extruder; and
    a third process of drying the extrusion and then sintering the extrusion that has been dried;
    wherein the vanadium ($V_2O_5$) and tungsten oxide ($WO_3$)-supported catalyst is prepared through processes including:
        a process of dispersing GO or RGO in deionized water;
        a process of dispersing AMV, which is a precursor of vanadium, and AMT, which is a precursor of tungsten, in deionized water;
        a process of mixing, by stirring, resulting substances; and
        a process of collecting the vanadium ($V_2O_5$) and tungsten oxide ($WO_3$)-supported catalyst through filtering (using a vacuum filtration device), drying, and heat-treating the resulting substances that have been stirred.

2. The method of claim 1, wherein the process of dispersing GO or RGO in deionized water achieves dispersion using ultrasonic waves.

3. The method of claim 1, wherein the heat-treating is conducted under a nitrogen atmosphere.

4. The method of claim 1, wherein the extruding is performed several times in a vacuum to reduce pores.

5. The method of claim 1, wherein the extrusion is in a form of a honeycomb.

6. The method of claim 1, wherein the extrusion is in a form of a plate.

7. The method of claim 1, wherein the extrusion is in a corrugated form.

8. An SCR catalyst prepared according to claim 1, the SCR catalyst comprising the vanadium ($V_2O_5$) and tungsten oxide ($WO_3$)-supported catalyst loaded thereon.

* * * * *